(12) United States Patent
Santillo et al.

(10) Patent No.: US 10,480,368 B2
(45) Date of Patent: Nov. 19, 2019

(54) SYSTEMS AND METHODS FOR DETECTING EXHAUST AIR LEAK

(71) Applicant: Ford Global Technologies, LLC, Dearborn, MI (US)

(72) Inventors: Mario Anthony Santillo, Canton, MI (US); Michael James Uhrich, West Bloomfield, MI (US); Joseph Norman Ulrey, Dearborn, MI (US); Andrew Bagnasco, Plymouth, MI (US); Michael Casedy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/688,627

(22) Filed: Aug. 28, 2017

(65) Prior Publication Data

US 2019/0063284 A1 Feb. 28, 2019

(51) Int. Cl.
| | |
|---|---|
| *F01N 3/18* | (2006.01) |
| *F01N 3/021* | (2006.01) |
| *F01N 3/035* | (2006.01) |
| *F01N 11/00* | (2006.01) |
| *F01N 13/00* | (2010.01) |

(52) U.S. Cl.
CPC ............... *F01N 3/18* (2013.01); *F01N 3/021* (2013.01); *F01N 3/035* (2013.01); *F01N 11/00* (2013.01); *F01N 11/002* (2013.01); *F01N 11/007* (2013.01); *F01N 13/008* (2013.01); *F01N 2410/00* (2013.01); *F01N 2560/025* (2013.01); *F01N 2560/08* (2013.01); *F01N 2900/04* (2013.01); *F01N 2900/06* (2013.01); *F01N 2900/1406* (2013.01); *F01N 2900/16* (2013.01); *F01N 2900/1606* (2013.01)

(58) Field of Classification Search
CPC ...... F01N 11/00; F01N 11/002; F01N 11/007; F01N 2900/04; F01N 2900/06; F01N 2900/1406; F01N 2900/16
See application file for complete search history.

(56) References Cited

U.S. PATENT DOCUMENTS

| | | |
|---|---|---|
| 6,397,583 B1 | 6/2002 | Davey et al. |
| 7,396,389 B2 | 7/2008 | Kariya et al. |
| (Continued) | | |

OTHER PUBLICATIONS

Ford Motor Company, "2014 My OBD System Operation Summary for Gasoline Engines," Available Online at www.fordservicecontent. com/ford_content/catalog/motorcraft/OBDSM1404.pdf, As last revised Jul. 30, 2013, 261 pages.

*Primary Examiner* — Audrey K Bradley
(74) *Attorney, Agent, or Firm* — Geoffrey Brumbaugh; McCoy Russell LLP

(57) ABSTRACT

Methods and systems are provided for differentiating an exhaust air leak from a catalyst monitor sensor degraded with a slow-response. In one example, a pressure proximate an exhaust system particulate filter less than a threshold pressure may indicate an exhaust air leak and responsive to the indication of the exhaust air leak, the thresholds for monitoring the catalyst monitor sensor response may be adjusted. In this way, the impact of an exhaust air leak on catalyst monitor output may be accounted for so that subsequent monitoring for threshold catalyst may continue to be performed accurately in the presence of an exhaust air leak.

20 Claims, 7 Drawing Sheets

(56) References Cited

U.S. PATENT DOCUMENTS

| | | |
|---|---|---|
| 9,359,967 B2 | 6/2016 | Santillo et al. |
| 9,664,095 B2 | 5/2017 | Van Nieuwstadt et al. |
| 2009/0013665 A1* | 1/2009 | Brahma .............. F02D 41/1495 60/276 |
| 2015/0337750 A1* | 11/2015 | Sealy ...................... F01N 11/00 60/274 |

* cited by examiner

SYSTEMS AND METHODS FOR DETECTING EXHAUST AIR LEAK

FIELD

The present description relates generally to methods and systems for differentiating a degraded catalyst from an exhaust air leak.

BACKGROUND/SUMMARY

Engine exhaust systems utilize emissions control devices to treat exhaust gas of internal combustion engines in order to reduce the amount of particulate emissions released to atmosphere. Emission control devices include catalytic converters, such as three way catalytic converters (TWC) capable of reducing NOx and other pollutants. Emission control devices may further include particulate filters (PFs) positioned downstream of the TWC to collect particulate matter, such as carbon particles from incomplete combustion. Exhaust gas sensors may be coupled to the emission control device to monitor the flow of exhaust and to control the air-fuel ratio (AFR) of exhaust near stoichiometry. The exhaust gas sensors may include various oxygen sensors, such as oxygen sensors coupled upstream and downstream of the catalytic converter. Other sensors may include temperature and pressure sensors. Emissions regulations require on-board diagnostic routines to be regularly performed to ensure that the various emissions control devices and the associated sensors are functioning.

One example approach for diagnosing the emission control device catalyst is shown by Santillo et al. in U.S. Pat. No. 9,359,967. Therein, during feedback engine air-fuel ratio control, responsive to a downstream catalyst exhaust gas sensor, degradation of the catalyst may be indicated in response to a catalyst transfer function determined within a specified frequency range, the range based on the exhaust gas sensor output. In other words, catalyst degradation may be determined following small air-fuel ratio variations that are otherwise routinely used to increase catalyst efficiency. In other approaches, catalyst degradation is determined based on the exhaust sensor output following a targeted significant perturbation.

However, the inventors herein have recognized potential issues with such systems. As one example, the approach of U.S. Pat. No. 9,359,967 relies on a fully functional exhaust gas sensor measurement to assess potential degradation of the catalyst. While other on-board diagnostic routines may indicate if the exhaust gas sensor is functional or degraded, such routines typically assess the output of the same sensor during selected conditions. However, since the output of the catalyst exhaust gas sensor are themselves significantly impacted by air-fuel ratio perturbations, there may be conditions when the sensor is determined to be degraded when it is functional. For example, if there is an exhaust air leak upstream of the exhaust gas sensor, the output of the sensor may inadvertently reflect a slow sensor response, even though the sensor is not degraded. Since the output of the sensor is relied on to diagnose the upstream catalyst, errors in sensor status can result in significant errors in catalyst status. For example, an inaccurate assessment of a slow sensor response can result in a false-pass of a catalyst monitor, resulting in emissions issues.

In one example, the issues described above may be addressed by a method for an engine, including: adjusting a diagnostic threshold of an oxygen sensor coupled downstream of an exhaust catalyst responsive to a measured pressure at a particulate filter coupled downstream of the oxygen sensor. In this way, the effect of an exhaust air leak at a downstream particulate matter filter may be used to assess the functionality of an upstream oxygen sensor, and adjust the execution of an on-board diagnostic routine.

As an example, responsive to entry conditions for a monitor for an exhaust oxygen sensor coupled downstream of an exhaust catalyst being met, a pressure associated with a particulate matter filter, coupled downstream of the oxygen sensor, may be assessed. If the pressure is indicative of an exhaust air leak, such as may occur when the pressure measured upstream or across the filter is lower than a threshold pressure, a threshold for the oxygen sensor monitor (herein also known as a CMS monitor) may be adjusted (e.g., lowered). The monitor is then executed with an output of the oxygen sensor compared to the adjusted threshold. Once the sensor monitor is executed reliably, a catalyst monitor which depends on the output of the sensor can be assessed.

In this way, an exhaust air leak that may corrupt the output of an oxygen sensor may be timely and reliably identified based on the output of a pressure sensor coupled to a downstream particulate matter filter. By reliably identifying an exhaust air leak, a degraded sensor response that is due to the effect of the exhaust air leak may be better differentiated from an actually degraded sensor response. By adjusting a diagnostic threshold for an oxygen sensor monitor based on a pressure response at a downstream particulate matter filter, the reliability of an oxygen sensor monitor may be improved. In turn, the reliability of a catalyst monitor, that uses the output of the oxygen sensor, can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
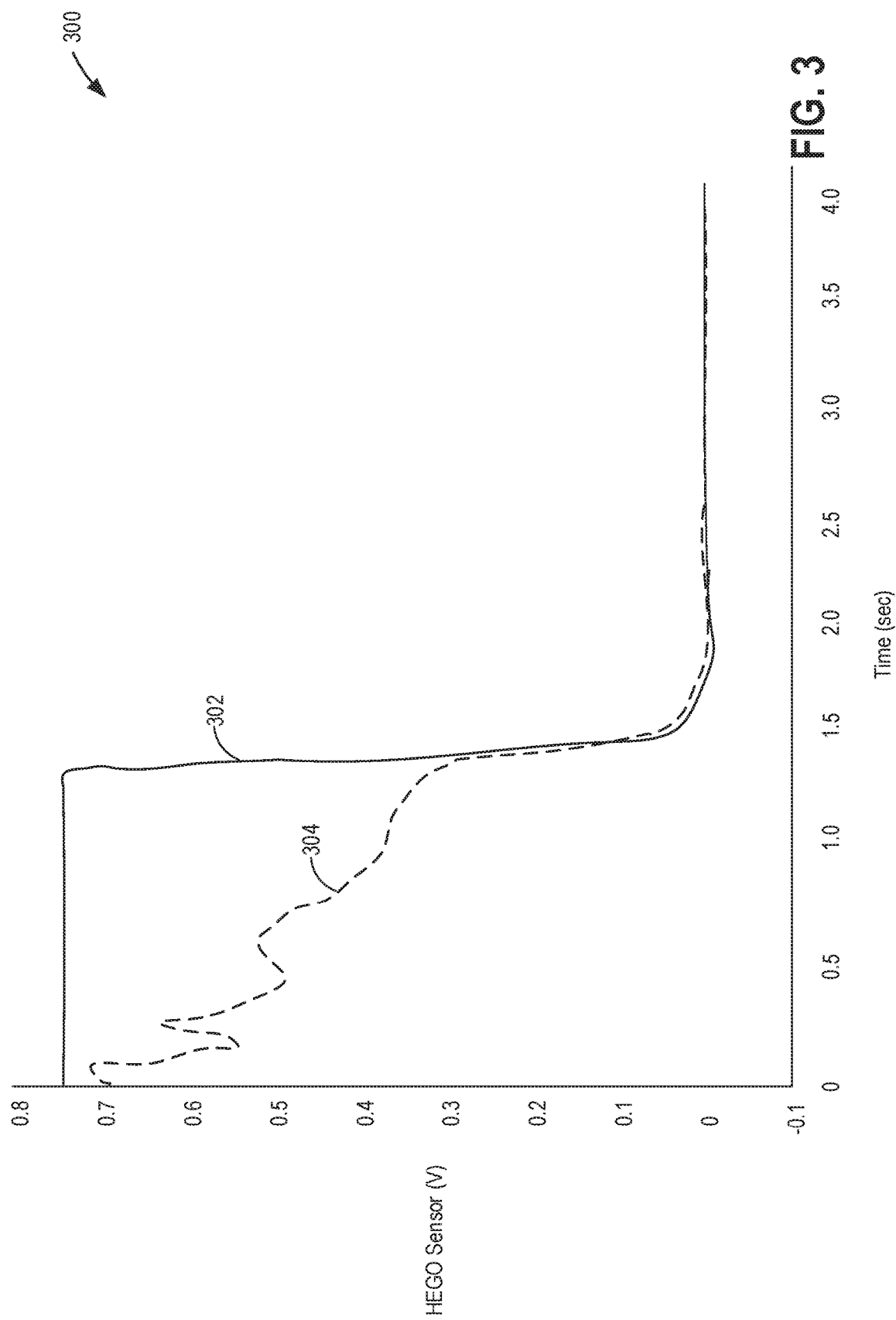
FIG. 3 shows a graph demonstrating the effect of a significant upstream exhaust air leak on CMS voltage response during a deceleration fuel shut-off event.
Figure 4:
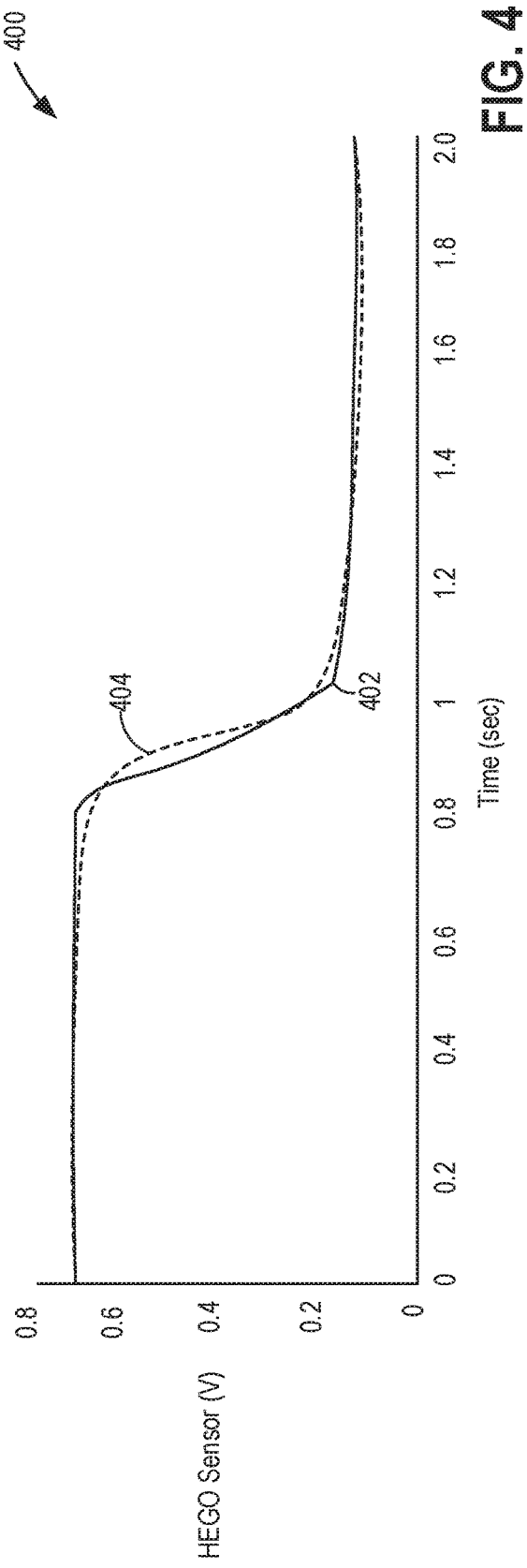
FIG. 4 shows a graph demonstrating the effect of a small upstream exhaust air leak on CMS voltage response during a deceleration fuel shut-off event.
Figure 5:
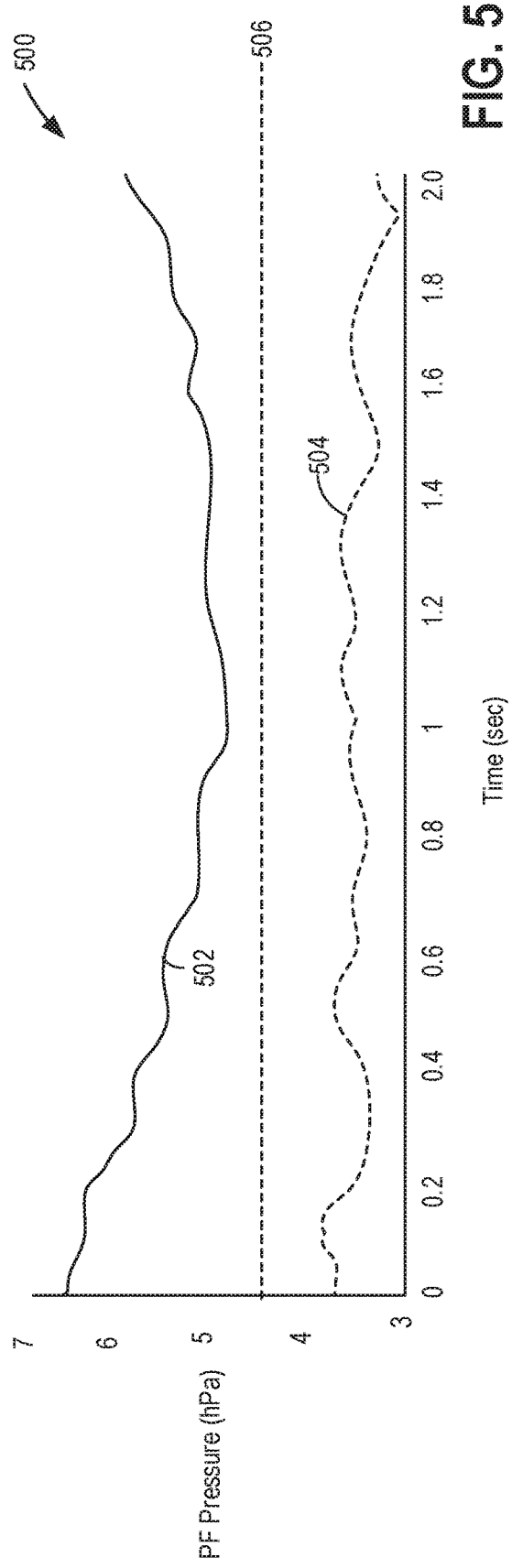
FIG. 5 shows a graph demonstrating the effect of an upstream exhaust leak on GPF inlet pressure sensor response during a deceleration fuel shut-off event.
Figure 6:
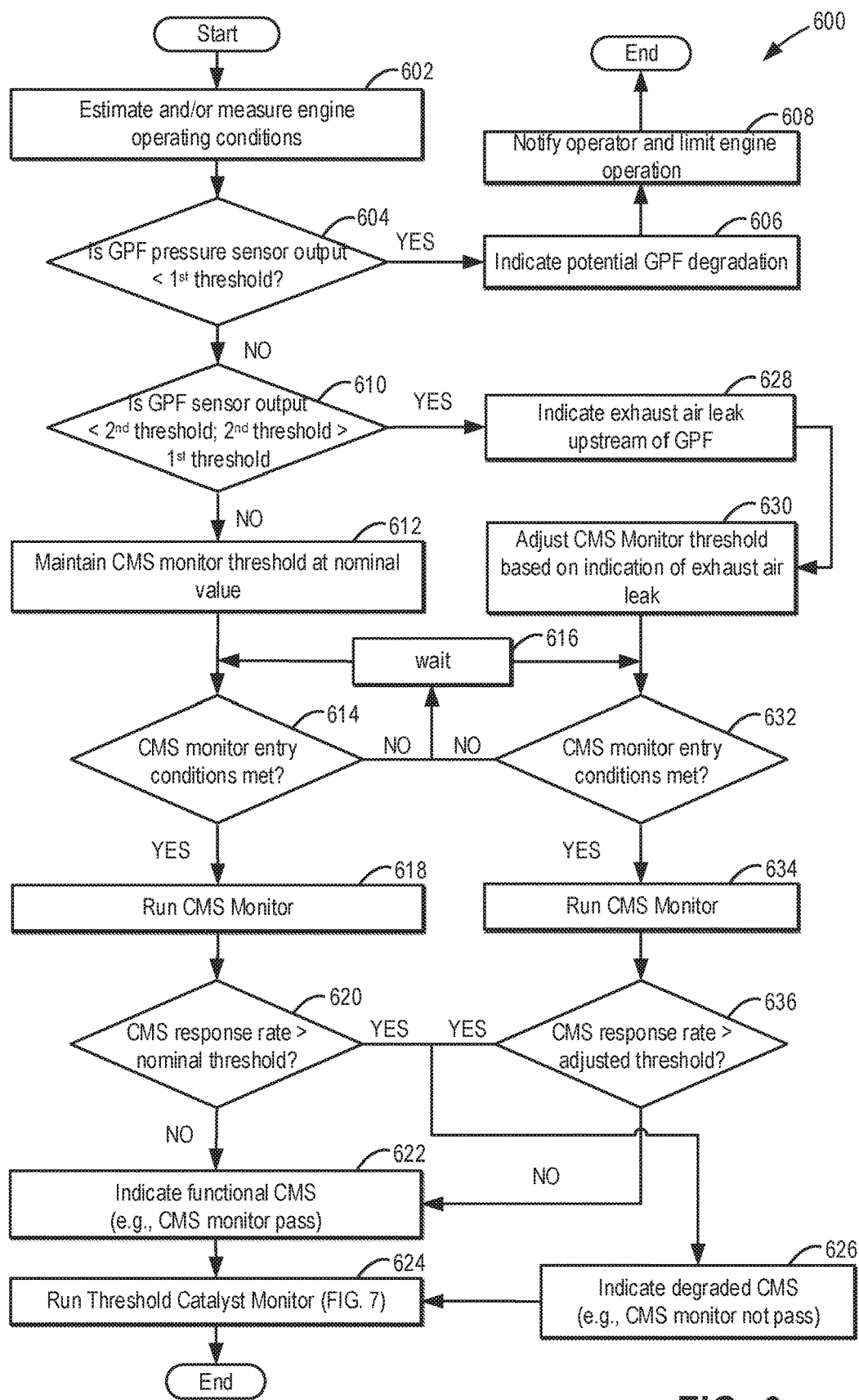
FIG. 6 shows a flow chart illustrating an example method for diagnosing an exhaust air leak and adjusting a voltage threshold for a CMS monitor responsive to an indication of the exhaust air leak.
Figure 7:
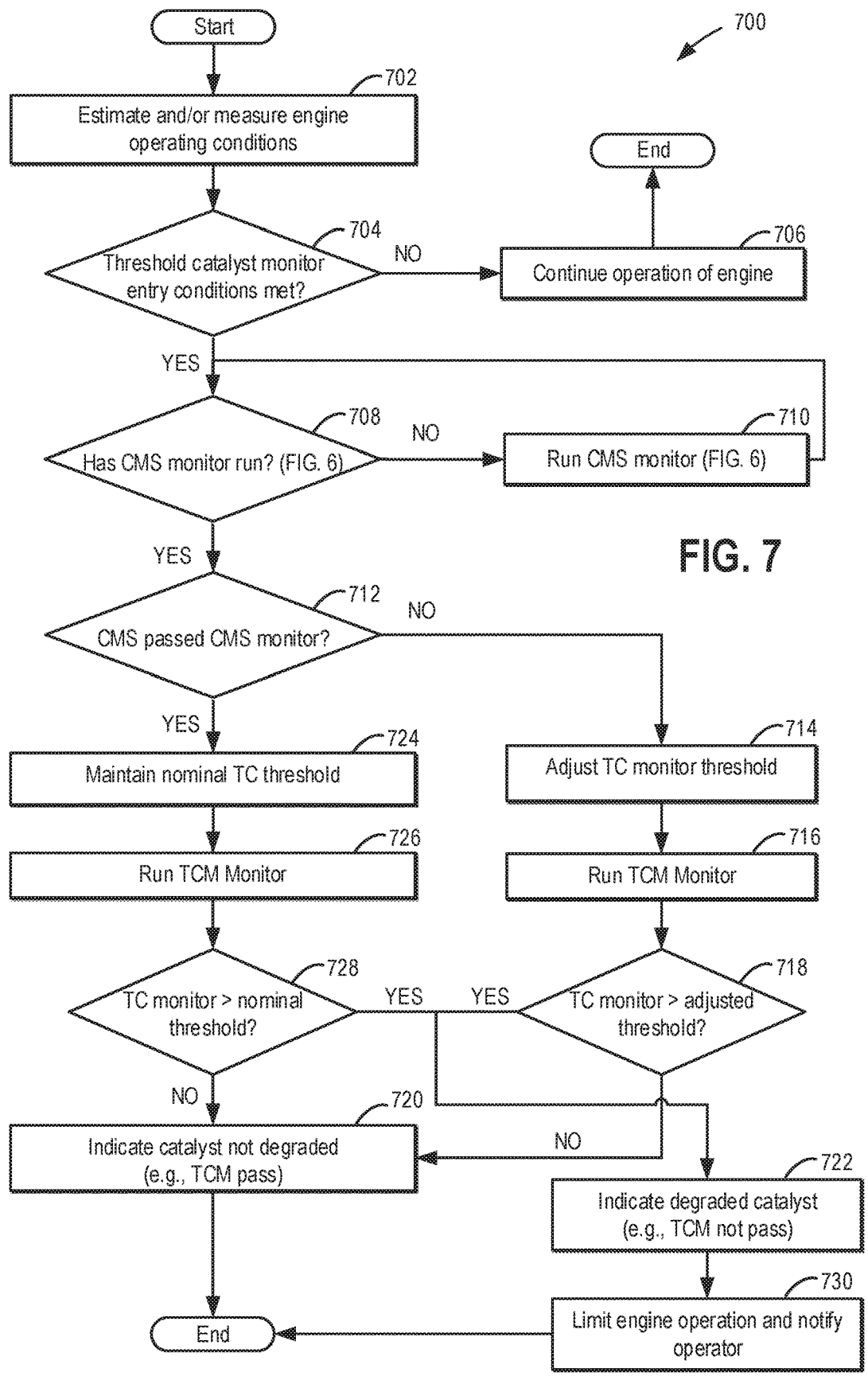
FIG. 7 shows a flow chart illustrating an example method for adjusting the execution of a Threshold Catalyst monitor responsive to the result of the CMS monitor.
Figure 8:
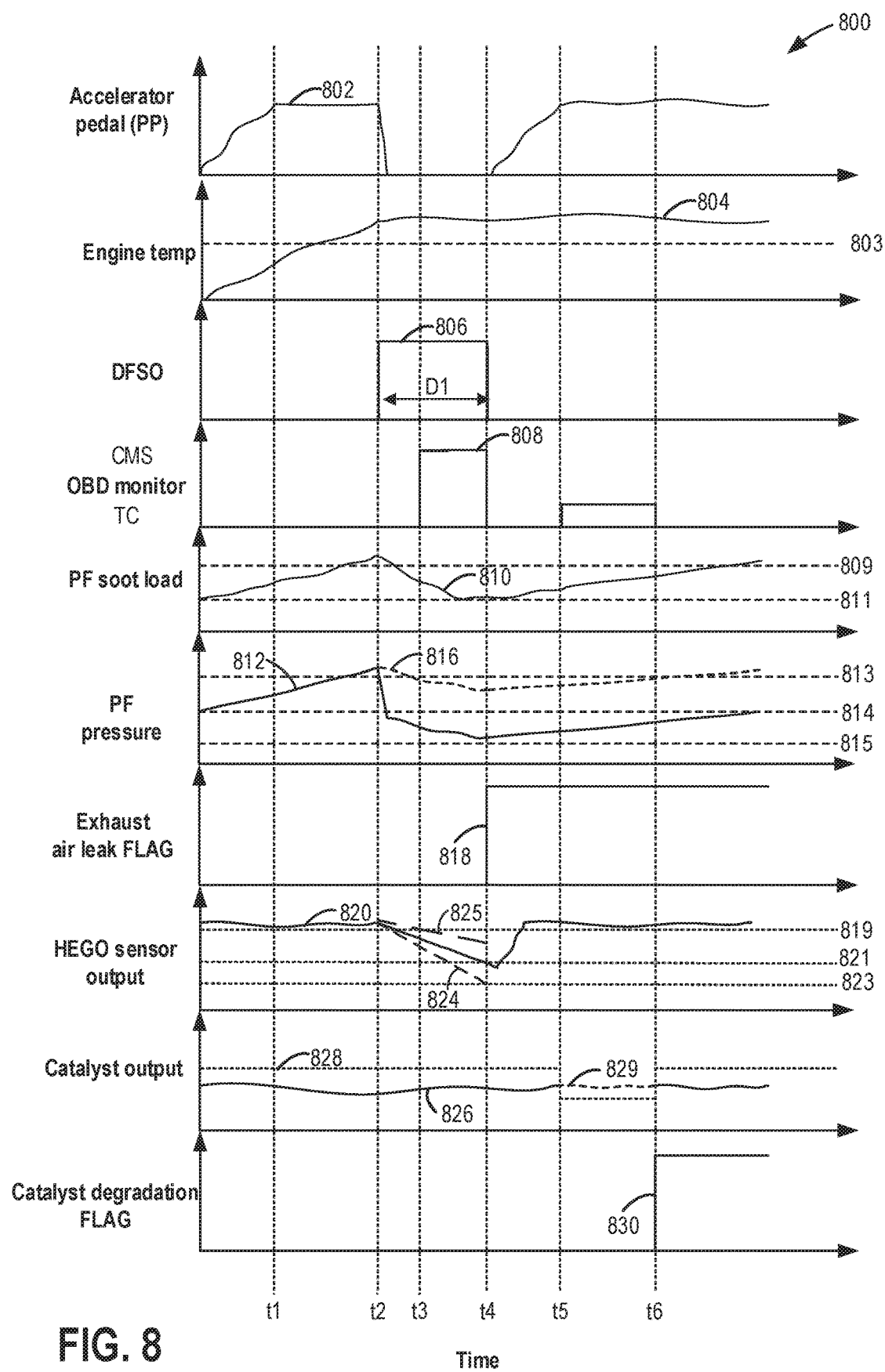
FIG. 8 shows a prophetic example of engine operation for diagnosing an exhaust air leak, and adjusting each of a CMS monitor and a catalyst monitor.

The following description relates to systems and methods for improving the reliability of an oxygen sensor monitor, as well as a catalyst monitor that uses the output of the oxygen sensor. The method enables an oxygen sensor response due to a degraded oxygen sensor to be differentiated from a similar response due to an upstream exhaust air leak. The systems and methods described herein may be implemented in a vehicle that includes an engine, such as the engine system depicted in FIG. 1, which may include an emission control device, such as the device of FIG. 2 having an exhaust catalyst coupled upstream of a particulate matter filter. Large exhaust air leaks may cause the output response of an exhaust gas sensor to slow, as shown in FIG. 3, which could potentially be mistaken as a degraded exhaust gas sensor. However, small exhaust air leaks may not cause such a dramatic change in exhaust gas sensor response and therefore, may be more difficult to identify, as shown in FIG. 4. By monitoring the pressure at or across a particulate filter of the exhaust system, which demonstrates a distinct response to an exhaust air leak (as shown in FIG. 5), the upstream exhaust air leak may be more reliably identified. Further, responsive to a diagnosed exhaust air leak, the diagnostic threshold for an oxygen sensor (CMS) monitor may be appropriately adjusted, as shown in FIG. 6. Based on the output of the CMS monitor, in turn, the threshold of a catalyst monitor may be adjusted, as shown in FIG. 7. An example engine operation and execution of on-board exhaust system monitors is shown in FIG. 8.

Figure 1:
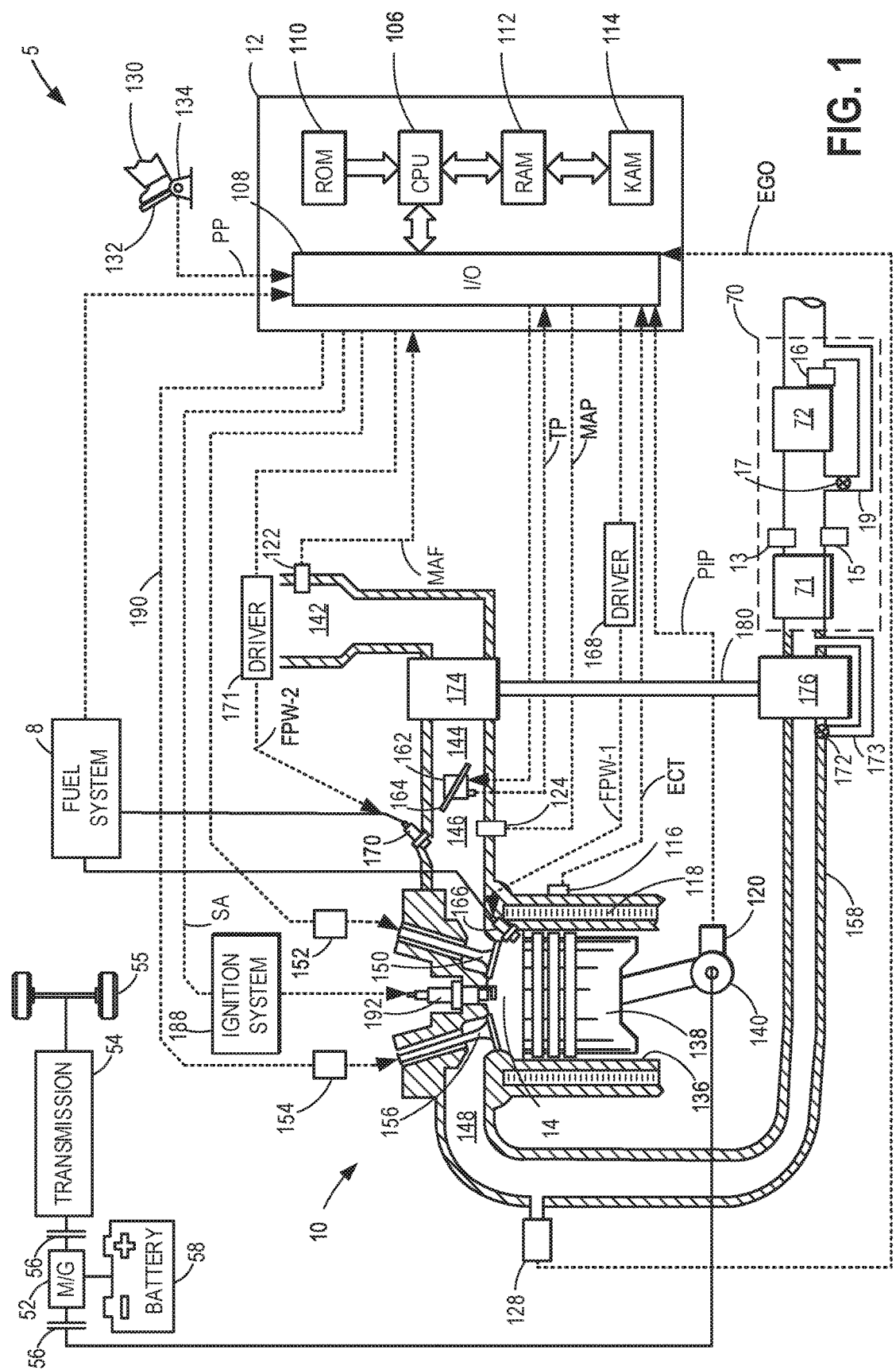
FIG. 1 shows a schematic diagram of a vehicle system with an emission control device that includes a particulate filter with a bypass.

Turning now to FIG. 1, it schematically illustrates one cylinder of multi-cylinder engine 10, which may be included in a propulsion system of a vehicle system 5. In some examples, vehicle system 5 may be a hybrid vehicle with multiple sources of torque available to one or more vehicle wheels 55. In other examples, vehicle system 5 is a conventional vehicle with only an engine, or an electric vehicle with only electric machine(s). In the example shown, vehicle system 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (e.g., cylinder) 14 of engine 10 may include combustion chamber walls 136 with piston 138 positioned therein. In some embodiments, the face of piston 138 inside cylinder 14 may have a bowl. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor (not shown) may be coupled to crankshaft 140 via a flywheel to enable a starting operation of engine 10.

Combustion chamber 14 may receive intake air from intake manifold 146 via intake passages 142 and 144, and may exhaust combustion gases via exhaust manifold 148. In this way, intake passages 142 and 144 are fluidically coupled to intake manifold 146. Intake manifold 146 and exhaust manifold 148 can selectively communicate with combustion chamber 14 via a respective intake valve 150 and exhaust valve 156. In some embodiments, combustion chamber 14 may include two or more intake valves and/or two or more exhaust valves.

Intake valve 150 and exhaust valve 156 may be controlled by controller 12 via respective electric variable valve actuators 152 and 154. Alternatively, the variable valve actuators 152 and 154 may be electro hydraulic or any other conceivable mechanism to enable valve actuation. During some conditions, controller 12 may vary the signals provided to the variable valve actuators to control the opening and closing of the respective intake and exhaust valves. The position of intake valve 150 and exhaust valve 156 may be determined by respective valve position sensors (not shown). In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 14 may alternatively include an intake valve controlled via electric valve actuation and an exhaust valve controlled via cam actuation including CPS and/or VCT.

Fuel injector 166 is shown coupled directly to combustion chamber 14 for injecting fuel directly therein in proportion to the pulse width of signal FPW-1 received from controller 12 via electronic driver 168. In this manner, fuel injector 166 provides what is known as direct injection of fuel into combustion chamber 14. It will be appreciated that the fuel injector may be mounted in the side of the combustion chamber or in the top of the combustion chamber, for example.

Fuel injector 170 is shown coupled directly to intake manifold 146 for injecting fuel directly therein in proportion to the pulse width of signal FPW-2 received from controller 12 via electronic driver 171. In this manner, fuel injector 170 provides what is known as port injection of fuel into intake manifold 146. Fuel may be delivered to fuel injector 166 and 170 by a fuel system 8 that may include a fuel tank, a fuel pump, and a fuel rail. It will be appreciated that engine 10 may include one or more of port fuel injection and direct injection.

As previously mentioned, some engine embodiments may include operating the engine in deceleration fuel shut-off (DFSO) mode to increase fuel economy and reduce brake wear. When the engine is operated in DFSO mode, the engine is operated without fuel injection while the engine continues to rotate and pump air through the cylinders.

Specifically, fuel injection via fuel injector 166 and/or fuel injector 170 to one or more cylinders 14 is disabled while intake air may continue to be pumped through the cylinders from the intake manifold to the exhaust manifold through the cylinders, via the operating intake and exhaust valves. DFSO entry conditions may be based on a plurality of vehicle and engine operating conditions. In particular, a combination of one or more of vehicle speed, vehicle acceleration, engine speed, engine load, throttle position, pedal position, transmission gear position, and various other parameters may be used to determine whether the engine will be entering DFSO. In one example, DFSO entry conditions may be met when the vehicle is decelerating (e.g., vehicle speed is decreasing). In another example, the DFSO entry conditions may be based on an engine speed below a threshold. In yet another example, the DFSO entry conditions may be based on an engine load below a threshold and/or decreasing engine load. In still another example, the DFSO condition may be based on an accelerator pedal position that indicates no torque is being requested. For example, during a tip-out where an operator releases the accelerator pedal (e.g., input device 132), DFSO entry conditions may be met and DFSO may be requested. Additionally or alternatively, entry into DFSO may be determined based on a commanded signal to cease fuel injection.

Ignition system 188 can provide an ignition spark to combustion chamber 14 via spark plug 192 in response to spark advance signal SA from controller 12, under select operating modes. Though spark ignition components are shown, in some embodiments, combustion chamber 14 or one or more other combustion chambers of engine 10 may be operated in a compression ignition mode, with or without an ignition spark.

Intake passage 144 or intake manifold 146 may include a throttle 162 having a throttle plate 164. In this particular example, the position of throttle plate 164, or a throttle opening, may be varied by controller 12 via a signal provided to an electric motor or actuator included with throttle 162, a configuration that is commonly referred to as electronic throttle control (ETC). In this manner, throttle 162 may be operated to vary the intake air provided to combustion chamber 14 among other engine cylinders. The position of throttle plate 164 may be provided to controller 12 by throttle position signal TP. Intake passage 142 may include a mass airflow sensor 122 for providing a MAF signal to controller 12, and intake manifold 146 may include a manifold absolute pressure sensor 124 for providing a MAP signal to controller 12.

Engine 10 may further include a compression device such as a turbocharger or supercharger including at least a compressor 174 arranged along intake passage 144. For a turbocharger, compressor 174 may be at least partially driven by a turbine 176 (e.g., via a shaft 180) arranged along an exhaust passage 158. If the engine includes a supercharger, compressor 174 may be at least partially driven by the engine 10 and/or an electric machine, and may not include a turbine. The compression device (e.g., turbocharger or supercharger) allows the amount of compression provided to one or more cylinders of the engine to be varied by controller 12.

In some embodiments, engine 10 may include an exhaust gas recirculation (EGR) system that includes a low pressure (LP) EGR and/or high pressure (HP) EGR passage for recirculating exhaust gas (not shown). One example of an EGR system includes a low pressure (LP) EGR system, where EGR may be routed from downstream of turbine 176 of a turbocharger to upstream of a compressor 174 of the turbocharger. In a high pressure (HP) EGR system, EGR may be routed from upstream of the turbine 176 of the turbocharger to downstream of the compressor 174 passage of the turbocharger. In both the LP and HP EGR systems, the amount of EGR provided to intake manifold 146 may be varied by controller 12 via a respective LP EGR valve and HP EGR valve (not shown). Further, an EGR sensor (not shown) may be arranged within the respective LP EGR passage and/or HP EGR passage, and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust O2 sensor 128 and/or an intake oxygen sensor (not shown). Under some conditions, the EGR system may be used to regulate the temperature of the air and fuel mixture within the combustion chamber and/or the temperature proximate to a particulate filter 72.

It will be appreciated that in several embodiments, exhaust passage 158 may include a bypass passage 173 with an inlet positioned upstream of the turbine 176. A flow control valve, known as a wastegate valve 172, may be disposed in the bypass passage. By adjustment of the position (e.g., degree of opening) of the wastegate valve 172, the amount of exhaust gas bypassing turbine 176 may be controlled. Position of the wastegate valve may be controlled via a wastegate actuator (not shown, and which may be hydraulic, pneumatic, electric, or mechanical in nature) responding to a signal from controller 12. For example, the controller 12 may receive an operator request to increase engine torque, and may increase boost pressure in order to meet the torque request. One way to increase boost pressure is to increase the amount of exhaust gas passing through turbine 176. To increase the amount of exhaust gas passing through turbine 176, the controller may send a signal to the wastegate actuator to change wastegate valve to a first position, or maintain a first position, (e.g., fully closed) so that no exhaust may travel through the bypass passage 173 and all exhaust gas passes through turbine 176. Conversely, to decrease boost pressure, the controller 12 may send a command signal to the wastegate actuator to cause the wastegate valve to assume, or maintain, a second position (e.g., fully open) to allow a percentage of exhaust gas traveling from exhaust passage 158 to flow past the wastegate valve 172, through bypass passage 173, thereby bypassing turbine 176, until the bypass passage reconnects to exhaust passage 158 downstream of turbine 176. It will be appreciated that wastegate valve may assume a plurality of intermediate positions (in response to controller 12 signaling the wastegate actuator to change position of the wastegate valve) residing between the first (e.g., fully closed) and second (e.g., fully open) positions, so that variable amounts of exhaust gas may travel through the bypass passage, thereby bypassing turbine 176.

Similarly, it will be appreciated that compressor 174 may include a recirculation passage (not shown) across the compressor. The recirculation passage may be used for recirculating (warm) compressed air from the compressor outlet back to the compressor inlet. In some embodiments, the compressor recirculation system may alternatively, or additionally, include a recirculation passage for recirculating (cooled) compressed air from the compressor outlet, downstream of a charge air cooler (not shown) to the compressor inlet or compressor bypass for dissipating compressed air to atmosphere. A flow control valve, known as a compression recirculation valve (not shown), may be included between the intake passage 142 and the recirculation passage. Depending on position of the wastegate valve, the amount of recirculating intake air may be controlled. A position of the compression recirculation valve (CRV) may be controlled via a CRV actuator (not shown, and which may be hydraulic, pneumatic, electric, or mechanical in nature) responding to a signal from controller 12. The CRV may be a continuously variable valve wherein a position of the valve is continuously variable from a fully closed position to a fully open position. In some embodiments, the compressor recirculation valve may be normally partially open during boosted engine operation to provide some surge margin. Herein, the partially open position may be a default valve position. Increasing the opening of the compressor recirculation valve may include actuating (or energizing) a solenoid of the valve.

Emission control device (ECD) 70 is shown arranged along exhaust passage 158 downstream of exhaust manifold 148 and downstream of exhaust gas sensor 128. Exhaust gas sensor 128 is shown coupled to exhaust passage 158 upstream of emission control device (ECD) 70. Exhaust gas sensor 128 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

In this example, ECD 70 includes a three way catalytic converter (TWC) 71, but it will be appreciated that any type of catalyst or catalytic converter may be used without departing from the scope of this disclosure. ECD 70 may also include particulate filter (PF) 72, but it will be appreciated that PF 72 may be any type of particulate filter, including but not limited to a diesel particulate filter (DPF) or a gasoline particulate filter (GPF). ECD 70 further includes a downstream exhaust gas oxygen sensor, also referred to herein as a catalyst monitor sensor (CMS) 13, which may be any type of exhaust gas sensor, including an oxygen sensor or HEGO sensor. CMS 13 is coupled downstream of TWC 71 and may be used to assess the state of the catalyst during the execution of a catalyst monitor. Also included in ECD 70 is a pressure sensor 15, and a temperature sensor 16. In the depicted embodiment, pressure sensor 15 is positioned upstream of PF 72 (or coupled to an inlet of the PF), and temperature sensor 16 is positioned downstream of PF 72, but it will be appreciated that one or more of the sensors shown in FIG. 1 may be omitted and/or repositioned without departing from the scope of this disclosure. For example, pressure sensor 15 may be a differential pressure sensor coupled across the inlet and the outlet of the PF. In some embodiments, PF 72 may include one or more catalyst materials in addition to components configured to filter exhaust gas. For example, PF 72 may be coated with a wash-coat including one or more catalyst materials. Such a configuration may be employed for embodiments in which engine 10 is spark-ignited, for example. In some embodiments, the TWC 71 and PF 72 may be separate components comprising separate housings positioned away from one another (e.g., the TWC being upstream of the PF as shown). A bypass passage 19 may be coupled to the exhaust passage 158 directly upstream and downstream of the PF 72 and thus be disposed around the PF 72. An exhaust control valve (e.g., bypass valve) 17 is positioned within the bypass passage 19. An example detailed ECD configuration is provided below with reference to FIG. 2. It will be understood, however, that ECD 70 is provided as a non-limiting example and that, in other embodiments, the ECD may include other components in addition to or in lieu of TWC 71 and/or PF 72, including but not limited to a lean NOx trap, an SCR catalyst, an oxidation catalyst, or an alternative gas treatment device. For example, in some embodiments, an alternate catalyst or exhaust after treatment device may be positioned upstream of the PF 72, in place of the TWC 71.

In the depicted embodiment, CMS 13 is a HEGO (heated exhaust gas oxygen) sensor, which may monitor an air-fuel ratio of the exhaust gas exiting TWC 71. It will be appreciated that another suitable type of exhaust gas sensor may be used to monitor the catalyst. Pressure sensor 15 may be positioned upstream of the PF 72, the output of which may provide an indication to the vehicle controller 12 of a level of exhaust backpressure from the PF 72, which may be a further indication of a soot load on the filter. For example, if the PF 72 has a higher soot load, there may exist an increased backpressure upstream of the PF 72. Pressure sensor 15 may be one of an absolute pressure sensor coupled to an inlet of PF 72, and a differential pressure sensor coupled to each of the inlet and an outlet of PF 72. Additionally, a first low threshold exhaust backpressure may be determined, indicative of a "clean" (e.g., minimal soot load) filter, and a second low threshold exhaust backpressure may be determined, indicative of a degraded (e.g., cracked or leaking) filter. In one example, the first low threshold exhaust backpressure and the second low threshold exhaust backpressure may be identical. For example, a PF 72 with no soot load may cause an exhaust backpressure upstream of the PF at the first low threshold exhaust backpressure. If the output of pressure sensor 15 indicates a pressure backpressure lower than the first low threshold exhaust backpressure, the controller may determine that the PF may be cracked or degraded.

Temperature sensor 16 may be positioned downstream of the PF 72 in order to monitor a temperature of the particulate filter. Specifically, output from the temperature sensor 16 may provide an indication of exhaust temperature to the controller 12. In some examples, the exhaust temperature may be the temperature proximate the outlet of the PF 72, or it may be the temperature of the particulate filter itself. It will be appreciated that a temperature sensor may additionally or optionally be placed upstream of the particulate filter in order to monitor a temperature gradient of an exothermic reaction occurring in the particulate filter during a regeneration, for example. In yet another example, temperature sensor 16 may be positioned within the PF 72.

Controller 12 is shown in FIG. 1 as a microcomputer, including microprocessor 106, input/output ports 108, an electronic storage medium (e.g., computer-readable) for executable programs and calibration values shown as read-only memory 110 in this particular example, random access memory 112, keep alive memory 114, and a data bus. Storage medium read-only memory 110 can be programmed with computer readable data representing instructions executable by microprocessor unit 106 for performing the methods described herein, as well as other variants that are anticipated but not specifically listed. As described above, FIG. 1 shows one cylinder of a multi-cylinder engine, and it will be appreciated that each cylinder may similarly include its own set of intake/exhaust valves, fuel injector, spark plug, etc.

Controller 12 may receive various signals from sensors coupled to engine 10, in addition to those signals previously discussed, including measurement of the temperature of exhaust gases and/or PF 72 from temperature sensor 16, measurement of a pressure (e.g., exhaust backpressure)

proximate the inlet of the PF 72 from pressure sensor 15, a degree of operator-demanded torque from pedal position sensor 134, and an air-fuel ratio of exhaust gas downstream of the TWC 71 from catalyst monitor sensor 13. Controller 12 may also receive signals including measurement of inducted mass airflow (MAF) from mass airflow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP), or throttle opening, from a throttle position sensor; and manifold absolute pressure signal, MAP, from pressure sensor 124, which may be used to provide an indication of vacuum, or pressure, in the intake manifold. Engine speed signal, RPM, may be generated by controller 12 from signal PIP. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall Effect sensor 120, which is also used as an engine speed sensor, may produce a predetermined number of equally spaced pulses each and every revolution of the crankshaft. The controller 12 receives signals from the various sensors of FIG. 1 (e.g., CMS 13, pressure sensor 15, temperature sensor 16, pedal position sensor 134, etc.) and employs the various actuators (e.g., a valve actuator of bypass valve 17, throttle plate 164, spark plug 192, etc.) of FIG. 1 to adjust engine operation based on the received signals and instructions stored on a memory of the controller.

In one example, the controller may reference a feed-gas soot model (stored in a memory of the controller and according to instructions stored on the memory) in order to estimate the amount of soot entrained in exhaust gas exiting cylinders of the engine and entering the particulate filter. The feed-gas soot model may use a plurality of sensor inputs in order to estimate the entrained soot. In one example, the output of engine coolant temperature sensor 116 may provide an indication of engine temperature and the output of exhaust gas sensor 128 may provide an indication of an air-fuel ratio. Based on these sensor inputs, the feed-gas soot model may be used by the controller to estimate an amount of soot entrained in exhaust gas. For example, the controller may determine a decreased amount of soot is entrained in the exhaust gas when the engine is operating near a stoichiometric air-fuel ratio, and the engine coolant temperature is above a "warm engine" threshold temperature. Responsive to data from the feed-gas soot model, the controller may use the estimated feed-gas soot levels (e.g., soot levels in the exhaust gas) to update a PF soot storage model. In one example, the PF soot storage model may be used by the controller to estimate an amount of soot stored in the PF 72. For example, the controller may estimate a decreased amount of soot stored in the PF when the PF recently underwent a regeneration during a DFSO, or when the exhaust backpressure (as may be indicated by pressure sensor 15) at the PF is below an upper threshold exhaust backpressure indicating a loaded PF.

Figure 2:
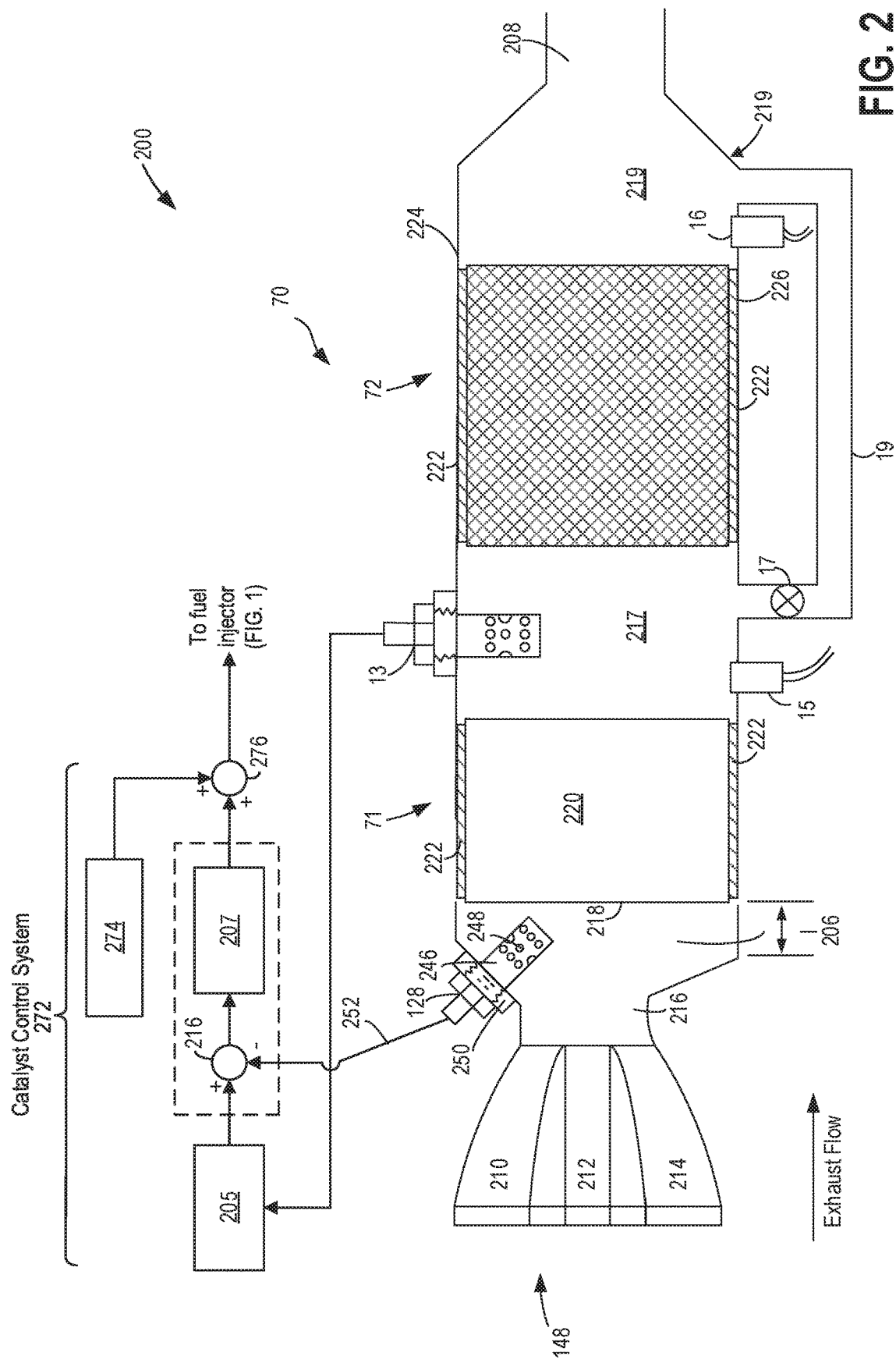
FIG. 2 shows a schematic diagram of an emission control device, such as the emission control device of FIG. 1, which includes a catalyst control system with feedback loops.

Turning now to FIG. 2, it shows an example vehicle exhaust system 200 including emission control device (ECD) 70 of FIG. 1. As such, like components previously introduced in FIG. 1 are numbered similarly in FIG. 2, and are not reintroduced. In one example, exhaust system 200 may be included in the emission control device of FIG. 1. Exhaust system 200 includes exhaust manifold 148 with a plurality of exhaust runners 210, 212, and 214 (e.g., passages) from which exhaust gas from engine cylinders (e.g., cylinder 14 of FIG. 1) flows. The exhaust runners converge to form a short, narrow exhaust runner convergence conduit 216 that feed exhaust into a collection region 206 upstream of ECD 70. Convergence conduit 216 may be identical or similar to exhaust passage 158 of FIG. 1. In this way, ECD 70 is configured to receive exhaust gases from engine 10 of FIG. 1.

ECD 70 includes TWC 71 positioned upstream of PF 72. TWC 71 may include a catalyst canister 218 positioned within an ECD body 219. Catalyst canister 218 is particularly positioned proximate and downstream of exhaust runner convergence conduit 216 and upstream of PF 72 described below. Catalyst canister 218 may include a catalyst brick 220 interposed between mounting mats 222 positioned between the catalyst brick and an upper wall 224 of ECD body 219 and between the catalyst brick and a lower wall 226 of the ECD body. As shown in FIG. 2, catalyst brick 220 is positioned in close proximity to exhaust manifold 148. Such a closely-coupled configuration may encourage the temperature of catalyst brick 220 to rise quickly to its light-off temperature. Upon reaching this light-off temperature, exhaust gas species in exhaust gas may be effectively converted to desirable inert gases before being exhausted to the tailpipe and to atmosphere.

It will be appreciated that ECD 70 is provided as a non-limiting example and that numerous additions and modifications to the ECD may be made without departing from the scope of this disclosure. For example, in other embodiments ECD 70 may include two or more catalyst bricks. One or more of the multiple catalyst bricks may include two or more different cell densities. The variation in cell densities among the multiple catalyst bricks may be the same or may differ between at least two of the catalyst bricks. Further, the average cell density among the multiple catalyst bricks may be the same or may differ between at least two of the catalyst bricks. Other features may or may not be shared among the multiple catalyst bricks, including but not limited to length, catalyst brick substrate materials, catalyst materials, and oxygen storage materials, if included.

Exhaust gas sensor 128 is shown positioned at an upstream region of the ECD proximate exhaust runner convergence conduit 216. As previously described, exhaust gas sensor 128 may be, but is not limited to, a linear oxygen sensor or universal or wide-range exhaust gas oxygen (UEGO), two-state oxygen sensor (EGO), heated EGO (HEGO), NOx, HC, or CO sensor. In the example depicted in FIG. 2, exhaust gas sensor 128 includes internal electrodes (not shown) encased within a metal shield 246. Exhaust gas flow originating from exhaust runners 210, 212, and 214 flows through exhaust runner convergence conduit 216 and is detected by the electrodes of exhaust gas sensor 128. The exhaust flow is detected by the electrodes after flowing into metal shield 246 via openings 248 arranged longitudinally along the bottom of the metal shield 246. A sensor housing 250 situates exhaust gas sensor 128 within ECD body 219 and couples the electrodes to a control system (e.g., controller 12 of FIG. 1) by wires 252. Readings from exhaust gas sensor 128 may be used to control operational aspects of ECD 70 as described below.

CMS 13 is shown positioned downstream of TWC 71, which may be configured similarly to exhaust gas sensor 128. As described in further detail below, readings from exhaust gas sensor 128 and CMS 13 may be used to control operational aspects of ECD 70. For example, a difference between the readings from each sensor may indicate an amount of oxygen stored in TWC 71. It will be appreciated that the relative positioning of exhaust gas sensor 128 and TWC 71 is non-limiting and that the sensor and/or catalyst may be placed elsewhere. In other embodiments three or more exhaust sensors may be included in ECD 70—for example, a third exhaust sensor positioned downstream of PF 72 described below, in addition to exhaust gas sensor 128 and 13.

Pressure sensor 15 is shown positioned between TWC 71 and PF 72 and configured to measure the pressure of exhaust gases flowing through the ECD 70 at a location upstream of PF 72. As shown therein, pressure sensor 15 is positioned along lower wall 226 and interposed between TWC 71 and a particulate filter described below. It will be appreciated that this positioning is non-limiting and that pressure sensor 15 may be located elsewhere in ECD 70. For example, one or more pressure sensors may be positioned upstream of catalyst brick 220 or downstream of the particulate filter. In other embodiments, pressure sensor 15 may be omitted from ECD 70, with exhaust pressure being inferred based on one or more engine operating parameters.

The embodiment of FIG. 2 also includes a temperature sensor 16 configured to measure the temperature of exhaust gases flowing through the ECD. As shown therein, temperature sensor 16 is positioned along lower wall 226 and after (directly downstream from) PF 72. It will be appreciated that this positioning is non-limiting and that a temperature sensor 16 may be located elsewhere in ECD 70. For example, one or more temperature sensors 16 may be positioned upstream of catalyst brick 220 or upstream of the particulate filter in order to measure a temperature gradient across the particulate filter. In this way, the exotherm across the particulate filter may be characterized and monitored, such as during a filter regeneration process. Alternately, temperature sensor 16 may be omitted from ECD 70, with exhaust temperature being inferred based on one or more engine operating parameters.

PF 72 is shown positioned downstream of TWC 71 within the ECD body 219. PF 72 may be interposed between mounting mats 222 positioned between the particulate filter and the upper wall 224 and between the particulate filter and the lower wall 226 of the ECD body. PF 72 may be configured to trap particulate matter such as soot mixed with exhaust gas as it flows through PF 72. As soot and/or other particulate matter accumulates in PF 72, backpressure in the particulate filter may increase, which can adversely affect engine operation and reduce fuel economy. As such, PF 72 may be periodically regenerated so that soot stored therein may be burned (e.g., incinerated). In some examples, PF 72 may be passively or actively regenerated responsive to a soot storage level in the filter exceeding a threshold soot level (as may be indicated by the output of pressure sensor 15 exceeding a threshold pressure). For embodiments in which ECD 70 is used in conjunction with a spark-ignition engine, PF 72 may be a gasoline particulate filter (GPF), and exhaust gas from the spark-ignition engine may be sufficiently hot to combust (e.g., incinerate) soot stored in the PF 72. However, in some instances, the spark-ignition engine may be predominantly operated under stoichiometric conditions, in which case a sufficient amount of gaseous oxygen may not be available for combusting the soot stored in PF 72, and an active regeneration may be initiated. As previously stated, PF 72 may be any type of particulate filter including, but not limited to, a gasoline particulate filter (GPF) or a diesel particulate filter (DPF).

Bypass valve 17 is shown disposed in bypass passage 19 coupled around PF 72, where the filter bypass flow (e.g., exhaust gas) only bypasses the PF 72 and not additional emission control devices or the TWC 71 positioned upstream of the PF 72. In this way, bypass passage 19 may be coupled to a first ECD passage 217 directly upstream of PF 72 and a second ECD passage 219 directly downstream of PF 72. In one example, responsive to a request to increase the amount of gasoline combustion exhaust gases bypassing the PF 72, controller 12 (of FIG. 1) may send a control signal to the actuator of bypass valve 17 in order to increase the opening of the bypass valve 17 such that an increased flow of combustion exhaust gas may enter the bypass passage 19. In this way, the amount of flow of combustion exhaust gas through the PF 72 may decrease as a greater proportion of the total amount of combustion exhaust gas travels through the bypass passage 19 and around PF 72. Conversely, reducing the flow of exhaust gas through the particulate filter bypass passage 19 may be achieved when the controller sends a control signal to the actuator of the bypass valve 17 in order to decrease the amount of opening of the bypass valve 17, which would cause an increase of flow of combustion exhaust gas through the PF 72. After exhaust gas passes through the PF 72 or bypass passage 19, the exhaust gas continues through tailpipe 208 toward atmosphere. In alternate embodiments, exhaust gas may continue through 208 to further exhaust treatment downstream.

FIG. 2 further includes a schematic illustration of inner and outer feedback control loops for a catalyst control system 272 for an engine, which may send and receive signals to and from a vehicle controller, such as controller 12, as may be included in engine 10 of FIG. 1. Catalyst control system 272 is shown receiving information from exhaust gas oxygen sensors and sending control signals to fuel injectors of the engine, such as fuel injectors 166 and/or fuel injector 170 (shown in FIG. 1). As one example, exhaust gas oxygen sensors may include exhaust gas sensor 128 located upstream of the emission control device 70, and CMS 13 located downstream of the TWC 71. Other sensors such as pressure, temperature, air-fuel ratio, and composition sensors may be coupled to various locations in the vehicle system. The catalyst control system 272 may receive input data from the various sensors, process the input data, and apply the actuators in response to the processed input data based on instructions or code programmed therein corresponding to one or more routines. Catalyst control system 272 may be configured with instructions stored in non-transitory memory that cause catalyst control system 272 to perform control routines via one or more actuators based on information received via one or more sensors. Example control routines are described herein with reference to FIGS. 7 and 8.

Catalyst control system 272 regulates the air-to-fuel ratio (AFR) to a desired air-fuel ratio near stoichiometry and fine-tunes this regulation based on the deviation of a HEGO voltage from a pre-determined HEGO-voltage set point. An inner-loop controller 207 uses the UEGO (e.g., upstream exhaust gas sensor) 128 for higher-bandwidth feedback control while outer-loop controller 205 uses the HEGO sensor (e.g., CMS) 13 for lower-bandwidth control. Catalyst control system 272 may be implemented by an engine controller, such as controller 12 of FIG. 1.

Inner-loop controller 207 may comprise a proportional-integral-derivative (PID) controller that regulates the engine AFR by generating an appropriate fuel command (e.g., fuel pulse width). A summing junction 276 combines the fuel command from inner-loop controller 207 with commands from a feed-forward controller 274. This combined set of commands is delivered to the fuel injectors (such as fuel injector 166 and/or fuel injector 170 of FIG. 1), exhaust gas sensor 128 provides a feedback signal to the inner-loop controller 207, the UEGO feedback signal proportional to the oxygen content of the feedgas or engine exhaust between the engine 10 and TWC 71. Outer-loop controller 205 generates a UEGO reference signal (e.g., a desired air-fuel ratio) provided to the inner-loop controller 207. The UEGO reference signal is combined with the UEGO feedback signal at convergence conduit 216. The error or difference signal provided by convergence conduit 216 is then used by inner-loop controller 207 to adjust the fuel command so that the actual AFR within combustion chambers of the engine approaches the desired AFR. HEGO sensor (e.g., CMS) 13 provides feedback to the outer-loop controller 205. The HEGO feedback signal may be used to adjust the UEGO reference signal, or air-fuel ratio reference signal, provided to inner-loop controller 207 via convergence conduit 216. Additionally, outer loop controller 205 works to increase catalyst efficiency by imposing a low amplitude air-fuel ratio square wave at the catalyst input. The square wave allows exhaust gas constituents entering the catalyst to vary so as to replenish oxygen and CO in the catalyst, thereby improving hydrocarbon oxidation and NOx reduction.

Because the CMS 13 is positioned the furthest downstream of the TWC 71, CMS 13 may be used for feedback control as well as input to diagnose whether a threshold catalyst level of exhaust gas leaving the TWC 71 is being exceeded. The threshold catalyst level may be defined as an upper threshold of emissions allowed to exit the TWC 71. In one example, in a rare double-fault scenario, it may be desirable for the downstream CMS 13 to diagnose the presence of a threshold catalyst level, even during conditions when the downstream CMS 13 is faulted with a slow response. In this case, accurate distinction between normal distribution of the catalyst output and threshold catalyst levels may be challenging. As elaborated at FIGS. 6-7, the output of the pressure sensor upstream of the PF may be advantageously used to diagnose for conditions where the CMS monitor response can be corrupted. By adjusting the threshold of the CMS monitor during such conditions, the reliability of the CMS monitor, and in turn the catalyst monitor which depends on the output of the CMS, can be improved.

Thus, the components of FIGS. 1 and 2 provide for an engine system, including: an engine; an exhaust passage including an exhaust catalyst; an upstream oxygen sensor coupled upstream of the exhaust catalyst; a downstream oxygen sensor coupled downstream of the exhaust catalyst; a particulate filter coupled downstream of the second oxygen sensor; a pressure sensor coupled to the particulate filter; and a controller with computer readable instructions stored on non-transitory memory for: responsive to entry conditions for a first monitor of the downstream oxygen sensor being met, comparing an output of the pressure sensor to a threshold pressure; and raising a threshold of the first monitor responsive to the output of the pressure sensor being higher than the threshold pressure; executing the first monitor; and indicating degradation of the downstream oxygen sensor responsive to an output of the downstream oxygen sensor exceeding the raised threshold following the executing of the first monitor.

It will be appreciated that various aspects of vehicle exhaust system 200 and ECD 70 may be modified without departing from the scope of this disclosure. For example, the relative positioning, geometries, and dimensions (e.g., length, width, height) of various components of exhaust system 200 (e.g., TWC 71, PF 72, exhaust gas sensor 128, catalyst monitor sensor 13, pressure sensor 15, and temperature sensor 16) may be adjusted. In some embodiments, two or more exhaust sensors, two or more pressure sensors, and/or two or more temperature sensors may be provided, while in other embodiments temperature sensor 16 may be omitted from exhaust system 200. In some embodiments, two or more ECDs may be provided in a cascaded fashion such that a first ECD (e.g., comprising a catalyst and/or a particulate filter) may be followed by a second ECD positioned downstream of the first ECD, where the second ECD may or may not include the same components as the first ECD. Further, ECD 70 may be modified to include, alternatively or in addition to TWC 71 and/or PF 72, other emission control devices, such as a NOx trap, SCR catalyst, etc.

Turning now to FIG. 3, it shows a graph 300 demonstrating the effect of a significant upstream exhaust air leak on CMS voltage response over time (e.g. voltage response of catalyst monitor sensor 13 of FIGS. 1 and 2) during a deceleration fuel shut-off (DFSO) event. As shown, graph 300 compares the voltage response of the downstream CMS (due to the deceleration fuel shut-off event) for both a nominal (e.g., no leak) exhaust system at plot 302 with an exhaust system with a significant air leak upstream of the sensor at plot 304. At time 0, the fuel delivery to the cylinders of the engine is stopped for the DFSO. It will be appreciated that a higher voltage output from the HEGO sensor corresponds to a rich exhaust gas, and a lower voltage output from the HEGO sensor corresponds to a lean exhaust gas. During a DFSO, the exhaust gas transitions from a rich exhaust gas mixture to a more lean exhaust gas mixture as a result of no combustion occurring during DFSO and intake air continuing to be pumped through the engine and exhaust system, thereby charging the catalyst with oxygen. In this particular example, at voltages higher than ~0.3V, the sensor response with the exhaust air leak appears to be slower than the sensor response with no exhaust air leak. Specifically, the rate of transition from high voltage to low voltage for the leaking exhaust system (304) appears to be muted in comparison to the rate of transition from high voltage to low voltage for the exhaust system with no leak (302), and could therefore be falsely classified by the CMS OBD Monitor as slow response degradation instead of an exhaust air leak. Furthermore, in the presence of a catalyst that is actually degraded, the degraded sensor response could mistakenly result in a false-pass result for the Threshold Catalyst (TC) OBD Monitor. Specifically, the TC monitor may assess the performance of the catalyst based on the output 304 of the catalyst monitor sensor, and if the TC monitor thresholds are not adjusted, or adjusted incorrectly, for an exhaust air leak, if present, the sensor response can be misleading. For example, if sensor degradation is falsely detected from an air leak and the thresholds are incorrectly modified for the catalyst monitor, the determined catalyst performance may be incorrect.

Turning now to FIG. 4, it shows a graph 400 demonstrating the effect of a small upstream exhaust air leak on CMS voltage response (e.g. voltage response of CMS 13 of FIGS. 1 and 2) during a DFSO event. As shown, graph 400 compares the voltage response of the CMS (due to the deceleration fuel shut-off event) for both a nominal (e.g., no leak) exhaust system at plot 402 with an exhaust system with a small air leak upstream of the catalyst monitor sensor at plot 404. As shown in FIG. 4, the slow-response of the CMS is not as apparent for a small upstream exhaust air leak as it is for the significant upstream exhaust air leak, as shown in FIG. 3. As a result, simply monitoring the CMS response alone may not be a robust and reliable diagnostic method for identifying exhaust air leaks.

Turning now to FIG. 5, it shows a graph 500 demonstrating the effect of an upstream exhaust leak on the output of a pressure sensor (e.g., pressure sensor 15 of FIGS. 1 and 2) during a DFSO event. It will be noted that the pressure sensor is positioned proximate (e.g., upstream) of a particulate filter (e.g., PF 72 of FIGS. 1 and 2). As shown, graph 500 compares the pressure response of the pressure sensor for both a nominal (e.g., no leak) exhaust system at plot 502 and an exhaust system with an air leak upstream of the pressure sensor at plot 504. As illustrated, an exhaust air leak causes a negative change in pressure sensor response compared to a pressure sensor response for a nominal, non-leaking exhaust system. In one example, a leaking exhaust system may cause the sensor response 504 for a leaking exhaust system to fall below a pressure threshold 506. In one example, pressure threshold 506 may represent the exhaust backpressure corresponding to a "clean" filter. In other examples, pressure threshold 506 may be low pressure threshold, which may be lower than the "clean" filter pressure threshold. In this way, more than one threshold may be used to assess potential degradation of the exhaust system and/or particulate filter. When the output of the pressure sensor is lower than pressure threshold 506, this may be indicative of a leak in the exhaust system and/or an otherwise degraded particulate filter.

Turning now to FIG. 6, it shows a flow chart illustrating an example method 600 for diagnosing an exhaust air leak and adjusting a threshold for a CMS monitor. The CMS monitor is a diagnostic routine that is used for assessing the functionality of a catalyst monitor sensor (e.g., HEGO sensor or catalyst monitor sensor 13 of FIGS. 1 and 2) responsive to an indication of an exhaust air leak. In one example, adjusting a threshold for the CMS monitor for the catalyst monitor sensor includes adjusting a rich-to-lean voltage threshold for the CMS monitor. In other examples, adjusting the rich-to-lean voltage threshold for the CMS monitor includes lowering the rich-to-lean voltage threshold for computing a slew rate during a DFSO event to determine the CMS response rate.

Instructions for carrying out method 600 and the rest of the methods included herein may be executed by a controller (e.g., controller 12 of FIG. 1 and/or controller 272 of FIG. 2) based on instructions stored on a memory of the controller and in conjunction with signals received from sensors of the vehicle system (e.g., vehicle system 5 of FIG. 1), such as the sensors described above with reference to FIGS. 1 and 2. The controller may employ engine actuators of the engine system to adjust engine operation, according to the methods described below.

Method 600 starts at 602, where the routine includes estimating and/or measuring current engine operating conditions. Current engine operating conditions may include, but are not limited to, an air-fuel ratio (e.g., an air-fuel ratio of combusted exhaust gases exiting engine cylinders), a position of the particulate filter bypass valve (e.g., bypass valve 17 shown in FIGS. 1 and 2), a duration since the last particulate filter regeneration, an engine speed and engine load, an engine coolant temperature, a degree of actuation of (or position of) an accelerator pedal, and an exhaust temperature and pressure proximate the particulate filter. Other conditions include MAP, MAF, boost pressure, etc. Current operating conditions assessed may also include a current particulate filter soot load, which may be modeled based on the level of feed-gas soot. The feed-gas soot level may be modeled based on one or more of the engine coolant temperature, torque, the air-fuel ratio, and the engine speed. Additional engine operating conditions may include a pressure and temperature measured at the exhaust system.

In one example, a combustion air-fuel ratio may be indicated by the output of an exhaust gas sensor (e.g. exhaust gas sensor 128 or catalyst monitor sensor 13 of FIGS. 1-2). In this way, a controller (e.g., controller 12 of FIG. 1) may determine whether the engine is running leaner than stoichiometry (lambda greater than 1) or richer than stoichiometry (lambda less than 1). In another example, the controller may further be able to infer the presence of a threshold catalyst (or a threshold catalyst state) by determining the magnitude of the catalyst's frequency domain transfer function in a specific range of frequencies corresponding to the square-wave input. Engine temperatures above an engine temperature threshold may indicate that the engine is warm, and not in a cold start condition. The controller 12 may receive the output of a pressure sensor (e.g., pressure sensor 15 of FIGS. 1-2) at the particulate filter, which may indicate a degree of soot loading on the particulate filter that will be described further below.

It will be appreciated that feed-gas soot, or exhaust gas soot, may be the amount of soot entrained in exhaust gas leaving the engine and entering the exhaust system. Ambient and other engine operating conditions may also be included as affecting feed-gas soot. One example of typical operating conditions that may generate feed-gas with soot levels below a first soot level threshold is when the engine coolant temperature is above a threshold engine temperature (e.g., when the engine is warm), when the air-fuel ratio is near a stoichiometric air-fuel ratio, and when the engine is not operating in compression injection mode. Conversely, one example of operating conditions that may generate feed-gas with soot levels above the first soot level threshold is when the engine coolant temperature is below the threshold engine temperature (e.g., during a cold start), and/or when the air-fuel ratio is rich.

In one example, the PF soot model may estimate soot each and every 100 ms, whereas a slower calibratable timer determines the frequency at which soot estimated by the model is accumulated and added to measured soot load value. This timer may be executed when the engine is running and the PF, such as a gasoline particulate filter, is not in a regeneration mode. This timer can be calibrated to execute as slow as each and every 6 minutes, for example, and thus an additional accumulator may be used to capture soot generated during transient operating conditions. This transient accumulator may also be reset at the same frequency as the timer stated above, but with a delay. Soot from the soot model may be accumulated independently and added to last measured soot load value. When a measured soot load value is available, the accumulated soot load from model is cleared (e.g., set to zero).

Under certain engine operating conditions, the PF soot load may not be accurately determined based on a measured differential pressure across the PF. For example, the PF soot load measurement may not be sufficiently accurate at low exhaust volume flows due to degraded accuracy of the pressure sensors at a low exhaust flow condition. Additionally, the PF soot load may be inaccurate during transients, due to the higher time constants of the sensors and/or the unsteady fluid dynamics in the exhaust system. Therefore, during these conditions, the estimate of PF soot loading is independent from the soot load based on the measured differential pressure across the PF. Instead, a PF soot model is used to estimate the soot load based on engine speed and load, which is then corrected for engine/environmental operating conditions. The corrected PF soot model output is then added to the most recent measurement of soot load from the differential pressure that occurred under conditions outside those noted above.

At 604, the routine includes determining whether the output of the pressure sensor proximate the particulate filter is lower than a first threshold pressure. The first threshold pressure may be a low threshold pressure that corresponds to a degraded particulate filter. In one example, the degraded particulate filter may be a cracked particulate filter, resulting in a significant pressure loss from the exhaust system to atmosphere. As a result of the significant pressure loss, the pressure at the particulate filter may less than the first threshold pressure. The first threshold pressure was discussed in reference to FIG. 5. If the pressure sensor output is less than the first threshold pressure, the routine proceeds to 606, where the routine includes indicating potential degradation of the particulate filter. The routine then proceeds to 608, where the routine includes notifying the operator of the potential particulate filter degradation and limiting engine operation. For example, a diagnostic code may be set and a malfunction indicator light (MIL) may be illuminated on a display panel of the vehicle to notify the operator, the code and MIL maintained until the filter is replaced or repaired. In this way, the method may indicate a state of the particulate filter based on the measured pressure at the particulate filter; and limit an engine load based on the indicated state. In one example, the indicated state may be a cracked or otherwise significantly degraded particulate filter or housing. The routine then ends.

If the PF pressure sensor output is not less than the first threshold pressure, the routine proceeds to 610, where the routine includes determining whether the PF pressure sensor output is less than the second threshold pressure. It will be noted here that the second threshold pressure may be greater than the first threshold pressure. In one example, the second threshold pressure may be a pressure at the particulate filter corresponding to an upstream exhaust air leak, where in a portion of the exhaust pressure may be lost to atmosphere upstream of the PF, thereby partially reducing the pressure upstream of the particulate filter.

If the PF pressure sensor output is not less than the second threshold, then the routine proceeds to 612, where the routine includes maintaining nominal thresholds for the CMS monitor. In some embodiments, thresholds for the CMS monitor may include a rich-to-lean response rate of the CMS, such as during a DFSO event, as shown in FIG. 3. In one example, a nominal rich-to-lean CMS response may be calculated as follows: interpolation may be used between CMS measurement data points for a fully functional CMS to determine the time at which the CMS output crosses a rich limit threshold (e.g., 0.6 volts, in one example), and additional interpolation may be used to determine the time at which the CMS output crosses a lean limit threshold (e.g., 0.2 volts, in one example) during a DFSO. The slope between the rich limit threshold and lean limit threshold may determine a nominal CMS response rate, and this data may be stored in a memory of the controller.

At 614, the routine includes determining whether CMS monitor entry conditions have been met. In one example, CMS monitor entry conditions may include the engine operating in DFSO mode. DFSO entry conditions and operation were described in reference to FIG. 1, and as such, will not be repeated here. Additional entry conditions may include determining whether a threshold duration or distance of travel has elapsed since a last iteration of the CMS monitor. In another example, entry conditions may be met when a threshold duration or distance of travel has elapsed since a last iteration of the catalyst monitor, since the CMS monitor needs to be executed in anticipation of execution of the catalyst monitor. In this way, initiating the CMS (e.g., oxygen sensor) monitor may be responsive to corresponding monitor entry conditions being met.

If CMS monitor entry conditions are not met, the routine waits at 616 until CMS monitor entry conditions are met. When CMS monitor entry conditions are met, the routine proceeds to 618, where the routine includes initiating the CMS monitor. In one example, running the CMS monitor includes measuring an actual rich-to-lean response rate of the CMS during the DFSO. Specifically, this may include determining a slew rate, or response rate, of the CMS between the time when a rich limit threshold is reached, and the time when a lean limit threshold is reached. In other examples, the CMS monitor may include invoking an air-fuel ratio oscillation and monitoring sensor response.

At 620, the routine includes comparing the actual CMS output (e.g., response rate) to the nominal response rate for the CMS to determine whether the actual CMS output is greater than the nominal response rate. In some embodiments, this includes comparing the rich-to-lean response rate of the CMS to a nominal rich-to-lean response rate for a fully functional CMS, as previously described. In other examples, this may include comparing the sensor response during the air-fuel ratio oscillation. If the CMS response rate is less than the nominal threshold, then the routine proceeds to 622, where the routine includes indicating that the CMS has passed the monitor and the CMS is functional. In this example, there is no indication of an exhaust air leak, and the CMS is functional. The routine may then continue to 624, where the routine includes running the threshold catalyst (TC) monitor, as elaborated at FIG. 7. If the CMS response rate is greater than the nominal threshold, then the routine proceeds to 626, where the routine indicates that the CMS did not pass the CMS monitor, and the CMS may be degraded. In some examples, the CMS being degraded includes the CMS operating with a slow response rate. In this example, there is no indication of an exhaust air leak, but the CMS may be diagnosed with a slow response due to an error at the sensor. The method then proceeds to 624, where the TC monitor of FIG. 7 is performed. However, responsive to a slow response of the sensor, a threshold for the TC monitor may be adjusted, as elaborated at FIG. 7. The method then ends.

If, at 610, the GPF sensor output is less than the second threshold, the routine continues to 628, where the routine includes indicating that an exhaust air leak may be present in the exhaust system upstream of the GPF. Responsive to the indication of an exhaust air leak, the CMS OBD monitor thresholds may be adjusted based on the indication of the air leak at 630. Responsive to an indication of an exhaust air leak, the diagnostic threshold (e.g., response rate or threshold slope) of the CMS monitor may be adjusted, for example lowered, to account for the exhaust air leak. As an example, adjusting the diagnostic threshold (of the CMS monitor) includes decreasing the diagnostic threshold responsive to the measured pressure exceeding the second threshold, the diagnostic threshold increased further as a difference between the measured pressure and the second threshold increases. For example, the threshold may be lowered further as the indication of an exhaust air leak increases. In this way, a diagnostic threshold of the oxygen sensor monitor is adjusted responsive to the measured pressure of the GPF including adjusting the threshold responsive to the measured pressure exceeding a threshold. In one example, the threshold is calibrated based on a soot load at the filter. It will be appreciated that the threshold against which the output of the pressure sensor is compared to assess the state of the sensor is distinct from the threshold against which the output of the pressure sensor is compared to assess particulate filter degradation. In this way, by adjusting the threshold of a CMS monitor responsive to an indication of an exhaust air leak, the controller may more reliably differentiate between an actual slow response of the CMS and an exhaust air leak that manifests itself as a slow CMS response. As a result, a more robust CMS diagnostic is provided, which may also provide more specific diagnostic information for repair technicians. In one example, responsive to an indication of an exhaust air leak upstream of the GPF, the routine may include lowering the rich-to-lean voltage threshold for computing a slew rate during a DFSO event in order to determine the CMS response rate. In this way, a slow CMS response rate may be identified in a nominal (e.g., no exhaust leak) case, as well as in the presence of an exhaust leak. In one example, responsive to a large air leak, the thresholds may be adjusted more than if a small air leak is detected.

At 632, the routine includes determine whether CMS monitor entry conditions have been met, as described above in reference to 614. If CMS monitor entry conditions are not met, the routine waits at 616. When CMS monitor entry conditions are met, the routine proceeds to 634, where the routine includes running the CMS monitor. In one example, running the CMS monitor includes measuring an actual rich-to-lean response rate of the CMS during a DFSO. Specifically, this may include determining a slew rate, or response rate, of the CMS between the time when a rich limit threshold is reached, and the time when a lean limit threshold is reached.

At 636, the routine includes comparing the actual CMS output (e.g., response rate) to the adjusted response rate for the CMS (as determined at 630) to determine whether the actual CMS output is greater than the adjusted response rate. Herein the adjusted response rate is lower than the unadjusted nominal response rate used at 620. In some embodiments, this includes comparing the rich-to-lean response rate of the CMS to the adjusted rich-to-lean response rate, as previously described. If the CMS response rate is less than the adjusted threshold, then the routine proceeds to 622, where the routine includes indicating that the CMS has passed the monitor and the CMS is functional. In this example, the exhaust system exhibits an exhaust air leak but a functional CMS. The routine may then continue to 624, where the routine includes running the threshold catalyst (TC) monitor, as elaborated at FIG. 7. If the CMS response rate is greater than the adjusted threshold, then the routine proceeds to 626, where the routine indicates that the CMS did not pass the CMS monitor, and the CMS may be degraded. In this example, the exhaust system exhibits both an exhaust air leak and a CMS with a slow-response due to CMS degradation. Herein, the CMS may be degraded with a slow response rate. The method then proceeds to 624, where the TC monitor is performed with the TC monitor threshold adjusted responsive to the indication of CMS sensor degradation.

Turning now to FIG. 7, it shows a flow chart illustrating an example method 700 for performing a threshold catalyst (TC) monitor, which is a diagnostic to determine whether an exhaust catalyst (such as TWC 71 of FIGS. 1 and 2) is degraded. It will be appreciated that method 700 may be performed as part of method 600 of FIG. 6, where after completion of the CMS monitor, the TC monitor may be performed.

A TC monitor may be performed using a HEGO sensor (e.g., CMS 13 of FIGS. 1 and 2) to identify the presence of a threshold catalyst (e.g., TWC 71 of FIGS. 1 and 2). In one example, the threshold catalyst may exhibit the maximum allowable emission levels leaving the catalyst, and may provide an indication of catalyst degradation. In some embodiments, a TC monitor may identify the presence of a threshold catalyst by determining the magnitude of the catalyst's frequency-domain transfer function in a specific range of frequencies corresponding to the square-wave input. Therein, a simplified model of the catalyst may be used that utilizes a system gain, a time delay, and an integrator. The system gain and the time delay may be functions of engine parameters such as air mass-flow rate, and may be determined using look-up tables stored in a memory of the controller. In one example, nominal system gain and time delay may be initially calibrated using a new catalyst, and as the catalyst ages, the system gain may be adjusted using a scaling gain to represent the aging. Once the scaling gain has been determined, it may be determined to the calibrated nominal value to determine whether or not a threshold catalyst is present. Further details regarding the TC monitor will be discussed below.

Diagnostic routine 700 begins at 702, where the routine includes estimating and/or measuring engine operating conditions. Current engine operating conditions may include, but are not limited to, an air-fuel ratio (e.g., an air-fuel ratio of combusted exhaust gases exiting engine cylinders), a position of the particulate filter bypass valve (e.g., bypass valve 17 shown in FIGS. 1 and 2), a duration since the last particulate filter regeneration, an engine speed and engine load, an engine coolant temperature, a degree of actuation of (or position of) an accelerator pedal, and an exhaust temperature and pressure proximate the particulate filter. Current vehicle conditions may also include a current particulate filter soot load, which may be modeled based on the level of feed-gas soot. The feed-gas soot level may be modeled based on one or more of the engine coolant temperature, torque, the air-fuel ratio, and the engine speed. Additional engine operating conditions may include whether an exhaust air leak was detected during a previous CMS monitor (of FIG. 6) and whether CMS thresholds were adjusted responsive to an indication of an exhaust air leak. Further, the controller may also determine whether the CMS was diagnosed with a slow response during the previous CMS monitor.

At 704, the routine includes determining whether TC monitor entry conditions have been met. In some embodiments, the TC monitor may be performed continuously when the outer loop feedback controller is enabled (as described in reference to FIG. 2). As a result, performing the TC monitor may not be restricted to steady state conditions or specific operating events such as DFSO or cold start. In some examples, TC monitor entry conditions may include one or more of an engine temperature above a threshold temperature, an exhaust temperature above threshold temperature, the catalyst being lit-off, an engine speed above a threshold speed, and an engine load above a threshold load. In addition, the TC monitor entry conditions may be met if a threshold distance or duration of vehicle travel has elapsed since a last iteration of the TC monitor. If the threshold catalyst monitor entry conditions are not met, then the routine proceeds to 706, where the routine includes continuing engine operation to meet torque demand. The routine then ends.

If TC monitor entry conditions are met, then the routine proceeds to 708, where the routine determines whether the CMS monitor (of FIG. 6) has completed. If a CMS monitor has not been completed since the previous TC monitor, the routine proceeds to 710, where the routine includes running or completing the CMS monitor of FIG. 6. After the CMS monitor has run, the method determines whether the CMS passed the CMS monitor at 712. In one example, the CMS may have passed the CMS monitor when the actual CMS response rate was within a nominal threshold (when no exhaust leak was indicated responsive to a particulate filter pressure above a threshold) or when the actual CMS response rate was within an adjusted threshold (when an exhaust leak was indicated responsive to a particulate filter pressure less than a threshold).

If the CMS did not pass the CMS monitor, the routine proceeds to 714, where the routine includes adjusting one or more TC monitor thresholds. Adjusting the threshold includes increasing or decreasing the nominal threshold level, pursuant to the type of catalyst monitoring algorithm being utilized. It will be appreciated that the catalyst model may utilize variables such as system gain and time delay, which may be functions of engine operating parameters such as air mass flow rate, and determined using look up tables or algorithms. In one example, the modeled output may be adjusted responsive to an indication of either an exhaust air leak or a degraded CMS, as may have been indicated when the routine of FIG. 6 was performed. In this way, both the CMS monitor and the Catalyst Monitor may be run concurrently, however, if the CMS monitor indicates that the Catalyst Monitor thresholds needed to be adjusted (after the catalyst monitor was already operating), the catalyst monitor data may be shifted or adjusted after the fact while maintaining the accuracy and reliability of the monitor results.

The method then continues to 716, where the TC monitor is executed. In some examples, each of the first (e.g., CMS) monitor and the second (e.g., TC) monitor may include oscillating an air-fuel ratio between a richer than stoichiometric air-fuel ratio and a leaner than stoichiometric air-fuel ratio. The TC monitor may be used to monitor the effectiveness of the catalyst in reducing tail pipe emissions. Namely, hydrocarbon (HC), NOx, and CO emissions may be monitored relative to thresholds that may be adjusted using a correction factor for the age of the catalyst. In one non-limiting example, running the TC monitor may comprise the following steps:

1) Estimate the scaling gain (representative of catalyst aging)
2) Convert the measured HEGO output voltage to an equivalent normalized air-fuel ratio using algorithms or a look-up table
3) Apply a frequency-domain band-pass filter to both the catalyst input (e.g., exhaust gas sensor 128 of FIGS. 1 and 2) and catalyst output (e.g., CMS 13 of FIGS. 1 and 2)
4) Apply a low-pass or moving average filter to the band-pass filtered input and output signals (which allows the input and output signals to be out of phase)
5) Compute a model error between the measured output and the modeled output through a predefined catalyst model consisting of a system gain, an integrator, and a time delay
6) Use the computed model error and an integrator with calibratable estimator gain to update the magnitude estimate of the catalyst frequency domain transfer function at the specified input frequencies
7) Compute an estimation maturity metric to ensure that sufficient estimation time has elapsed to make a threshold catalyst monitor determination
8) Once the maturity metric is met, compare the magnitude estimate to a predetermined threshold value to determine whether a threshold catalyst is present.

At 718, the routine includes determining whether the outcome of the TC monitor is greater than an adjusted threshold determined at 714. Specifically, the outcome of the TC monitor may determine whether emissions above a threshold emissions level are passing through the catalyst. (e.g., whether the catalyst is degraded). If the output of the TC monitor is greater than the adjusted threshold, then the threshold catalyst monitor may not have passed, and the catalyst may be indicated as degraded at 722. In some examples, degradation of the catalyst may manifest as one or more emissions level leaving the catalyst exceeding allowable thresholds. In other examples, indicating degradation of the catalyst may include indicating catalyst aging. Responsive to the indication of a degraded catalyst, the routine may proceed to 730, where the routine may include one or more of setting a diagnostic code, illuminating a MIL light, and limiting engine operation. In other examples, responsive to the indication of degradation of the catalyst, the controller may send a command signal to reduce an amplitude of the air-fuel ratio oscillation.

If the outcome of the TC monitor is less than the adjusted threshold determined at 714, the routine proceeds to 720, where the routine includes indicating the that emissions pass the threshold catalyst monitor and that the catalyst is not degraded. The routine then ends.

If the CMS passed the monitor at 712, the routine proceeds to 724, where the routine includes maintaining nominal thresholds. In one example, this may include maintaining nominal thresholds for the catalyst model, and variables such as the system gain and time delay may not be determined as functions of engine operating parameters such as air mass flow rate and determined using look up tables or algorithms. In one example, the modeled output may be adjusted responsive to an indication of either an exhaust air leak or a degraded CMS, as may have been indicated when the routine of FIG. 6 was performed. Responsive to an indication that the CMS passed the monitor, an air mass flow rate may be used without adjustment when determining the modeled output, and a correction factor may not be used to determine the model error to compensate for a degraded CMS. Since an exhaust air leak may exist with a functional CMS, in some embodiments, the thresholds for the TC monitor may be adjusted to reflect the exhaust air leak conditions.

At 726, the TC monitor may be performed using nominal thresholds, and at 728, the routine includes comparing the output (e.g., outcome) of the TC monitor to the nominal thresholds established at 724. If the outcome of the TC monitor determines that a threshold catalyst is present, (e.g., TC monitor output>nominal threshold) then the threshold catalyst monitor may not have passed, and the catalyst may be indicated as degraded at 722. Specifically, the emissions leaving the catalyst may have exceeded allowable thresholds. Responsive to the indication of a degraded catalyst, the routine may proceed to 730, where the routine may include one or more of setting a diagnostic code, illuminating a MIL light, and limiting engine operation.

If the outcome of the TC monitor is less than the nominal threshold at 724, the routine proceeds to 720, where the routine includes indicating that emissions levels pass the threshold catalyst monitor and that the catalyst is not degraded. The routine then ends.

Turning now to FIG. 8, it shows a prophetic operation map 800 of an engine (such as engine 10 of FIG. 1) including monitoring a pressure proximate a particulate filter and diagnosing an exhaust air leak based on the pressure relative to a threshold. Further, map 800 includes adjusting a CMS monitor threshold responsive to an indication of the exhaust air leak. Additionally, subsequent threshold catalyst monitor inputs may be adjusted responsive to the results of the catalyst monitor sensor diagnostic, and whether an exhaust air leak was diagnosed. Map 800 includes various engine parameters along the vertical axis, and elapsed time along the horizontal axis. Map 800 depicts accelerator pedal position (PP) at plot 802 which is indicative of operator torque demand. Map 800 further depicts an engine temperature at plot 804 relative to a warm engine threshold temperature at 803, whether the engine is being operated in DFSO mode at 806, whether a CMS OBD monitor or a TC OBD monitor is being performed at plot 808. Map 800 also depicts a particulate filter (PF) soot load at plot 810, relative to an upper soot load threshold at 809 and a lower soot load threshold 811, and a pressure at a PF 812 relative to an upper threshold pressure 813, a clean threshold pressure 814, and a degradation threshold pressure 815. It will be appreciated that the clean threshold pressure 814 may correspond to a pressure at the PF for a clean (e.g., no soot load) filter, below which may indicate an upstream exhaust air leak. Further, the degradation threshold pressure 815 may correspond to a pressure at the PF for degraded PF, below which may indicate a cracked filter housing or a filter housing with a significant leak. An exhaust air leak diagnostic flag is shown at 818, and the output of a HEGO sensor (e.g., CMS sensor 13 of FIGS. 1-2) is shown at plot 820. A measured catalyst output is shown at 826, relative to a modeled catalyst threshold at 828, and a catalyst degradation diagnostic flag at 830. A modeled catalyst output is shown at 829.

Prior to time t1, an operator is requesting torque, as indicated by an increasing actuation of the accelerator pedal (plot 802). As a result, the engine temperature increases (plot 804). The engine may be operating at a rich air-fuel ratio, and so exhaust gas may is passed through the particulate filter (PF) so that particulate matter may be loaded onto the filter. As a result, the soot load of the PF may increase (plot 810). As a result of increasing soot load in the PF, the pressure at the PF may increase in a corresponding manner (plot 812). Because there is a torque demand, the engine is not operated in DFSO. The output of the HEGO sensor 820 (e.g., CMS positioned downstream of the catalyst) remains approximately at stoichiometric (819). The measured output of the catalyst (plot 826) remains below a modeled catalyst output threshold (828).

At time t1, the operator stops requesting acceleration and requests a steady torque from the engine as indicated by stable actuation of the accelerator pedal (plot 802). As a result, the engine still does not operate in DFSO (plot 806). As the engine continues to operate, the engine temperature (plot 804) increases above a warm engine threshold temperature 803, and the soot load of the PF continues to increase (plot 810) toward an upper soot load threshold 809. The pressure at the PF 812 may also continue to increase toward an upper threshold pressure 813.

At time t2, there is a decrease in actuation of the accelerator pedal (plot 502). This may be the result of an operator tip-out. Responsive to DFSO conditions being met at time t2, the engine enters DFSO mode (plot 806), and fuel is no longer delivered to cylinders of the engine. Engine operation in DF SO mode lasts for a duration D1 (e.g., from time t2 to t4). In the depicted example, exhaust temperatures reach regeneration temperatures and as a result, the PF is passively regenerated during the DFSO, resulting in a reduction of soot load in the PF (plot 810). Specifically, the soot load of the PF moves away from an upper soot load threshold 809 toward a lower soot load threshold 811 as soot in the PF is incinerated. The pressure at the PF also reduces (plot 812) while the engine is operated in DFSO mode. Specifically, the pressure of the PF moves away from an upper threshold pressure 813 toward a clean threshold pressure 814. The entry conditions for the CMS monitor may be met at time t2, but the diagnostic may not be initiated until time t3 (e.g., after the pressure at the particulate filter is determined and the presence or absence of an exhaust air leak is determined).

Between time t2 and time t3, the pressure at the PF drops below the clean threshold pressure 814, but does not go below the degradation threshold pressure 815. Responsive to the lower than threshold pressure at the PF, the controller may infer that there is an exhaust air leak upstream of the PF and the CMS sensor. Since the air leak can corrupt the output of the CMS, and any monitors that rely on the output of the CMS, to improve the reliability of those monitors, the controller may communicate the status of the exhaust air leak to the CMS monitor first. In one example, the exhaust air leak may be an exhaust air leak upstream of the PF, resulting in a loss of exhaust system pressure to atmosphere, thereby reducing the pressure within the PF below the clean threshold pressure 814. At time t3, the execution conditions for performing a catalyst monitor sensor diagnostic (e.g., CMS monitor) are met and so the CMS monitor is initiated. As previously described, entry conditions for performing the catalyst monitor sensor diagnostic may include the engine operating in DFSO mode. Additional entry conditions may include determining whether the pressure at the particulate filter is within one or more thresholds, and whether an exhaust air leak has been identified.

The CMS OBD monitor runs from time t3 to time t4, where the CMS monitor includes measuring an actual rich-to-lean response rate of the CMS during the DFSO. Specifically, this may include determining a slew rate (e.g., response rate, slope) of the CMS between the time when a rich limit threshold is reached, and the time when a lean limit threshold is reached. The response rate of the HEGO sensor output 820 demonstrates a slow-response, but because of the previous identification of an exhaust air leak, the threshold for the slew rate is reduced from an upper slew rate threshold 823 (e.g., greatest slope) to a middle slew rate threshold 821. Because the CMS response rate is not less than the middle slew rate threshold 821, the CMS is exonerated from slow-response degradation. For illustrative purposes, an exhaust system with no exhaust air leak and a fully functional HEGO sensor would exhibit a slew rate during a DFSO according to plot 824 (small dashed lines), and an exhaust system with an exhaust air leak and a slow-response HEGO sensor would exhibit a lower slew rate during a DFSO according to plot 825 (long dashed lines). Between t3 and t4, measured catalyst levels (826) leaving the catalyst are below a modeled catalyst output 828.

At time t4, there is a tip-in (802), and so the DFSO ends (806). At that time, the CMS OBD monitor also ends, and so there is a flag indicative of an exhaust air leak (818). The output of the HEGO sensor may increase back toward stoichiometric, as the engine load increases. At time t5, the entry conditions for performing a threshold catalyst (TC)

monitor are met and so the monitor is initiated. In some embodiments, the TC monitor may be performed continuously when the outer loop feedback controller is enabled (as described in reference to FIG. 2). As a result, performing the TC monitor may not be restricted to steady state conditions or specific operating events such as DFSO or cold start. In some examples, TC monitor entry conditions may include one or more of an engine temperature (804) above a threshold temperature (803), an exhaust temperature above threshold temperature, the catalyst being lit-off, an engine speed above a threshold speed, and an engine load above a threshold load. Additional TC monitor entry conditions may include conclusion of a CMS monitor that determined whether or not an exhaust leak was present and/or whether the CMS was diagnosed with a slow-response.

The TC monitor (808) is performed from time t5 to time t6. Responsive to the earlier indication of an exhaust air leak during the execution of the CMS monitor between t3 and t4, the modeled output for the threshold catalyst may be adjusted. In one example, this may include adjusting the system gain and/or time delay variables used to model the catalyst, which may be functions of engine operating parameters such as air mass-flow rate. It will be appreciated that parameters such as air mass-flow rate may be impacted by an air leak from the exhaust system to atmosphere, and adjusting variables dependent on such parameters responsive to an indication of an air leak would provide a more accurate and robust diagnostic of threshold catalyst levels. As a result of the indication of the exhaust air leak, the modeled output (dashed segment 829) for the threshold catalyst may be adjusted downward, resulting in the catalyst output exceeding the adjusted modeled catalyst output during the diagnostic between t5 and t6. As a result, when the TC monitor ends at time t6, the catalyst may be flagged as degraded (plot 830).

In this way, the likelihood of a false-pass result when performing a TC monitor may be reduced by initially determining whether an exhaust air leak is present based on the output of a PF pressure sensor. By adjusting the threshold for a CMS monitor based on the outcome of the leak, slow response of the downstream oxygen sensor due to sensor degradation may be better differentiated from slow response of the downstream oxygen sensor due to exhaust air leak. By also adjusting the threshold for a TC monitor to account for an exhaust air leak induced slow-response of the CMS, inaccuracies at monitors relying on the output of the CMS can be reduced. In this way, a more robust exhaust diagnostic can be provided whose results are not corrupted by the presence of an exhaust air leak. The technical effect of identifying an exhaust air leak using a pressure indication at a particulate filter downstream of the catalyst is that the higher sensitivity of the pressure response at the particulate filter may be leveraged to identify even small pressure differences caused by an exhaust air leak, irrespective of the size of the leak. Further, if an exhaust air leak is present, thresholds for the catalyst monitor sensor diagnostic can be timely adjusted to enable separation between a true slow response of the catalyst monitor sensor and an exhaust air leak, which may manifest themselves similarly as a muted CMS response. Overall, the likelihood of a false-pass of threshold catalyst monitor can be reduced, improving engine emissions compliance.

A method for an engine includes: adjusting a diagnostic threshold of an oxygen sensor coupled downstream of an exhaust catalyst responsive to a measured pressure at a particulate filter coupled downstream of the oxygen sensor. In a first example of the method, the method further includes wherein the measured pressure at the particulate filter includes one of a measured inlet pressure of the particulate filter and a differential pressure across the particulate filter. A second example of the method optionally includes the first example and further includes wherein the adjusting responsive to the measured pressure includes adjusting responsive to the measured pressure exceeding a first threshold, the first threshold calibrated based on soot load at the filter, the method further comprising, responsive to the measured pressure exceeding a second threshold, higher than the first threshold, indicating particulate filter degradation. A third example of the method optionally includes one or more of the first and second examples, and further includes wherein the adjusting includes increasing the diagnostic threshold responsive to the measured pressure exceeding the first threshold, the diagnostic threshold increased further as a difference between the measured pressure and the first threshold increases. A fourth example of the method optionally includes one or more of the first through third examples, and further includes indicating an exhaust air leak responsive to the measured pressure exceeding the first threshold. A fifth example of the method optionally includes one or more of the first through fourth examples, and further includes, wherein the diagnostic threshold is a first diagnostic threshold for an oxygen sensor monitor, the method further including: initiating the oxygen sensor monitor responsive to corresponding monitor entry conditions being met; indicating degradation of the oxygen sensor responsive to a measured output of the oxygen sensor exceeding the first diagnostic threshold; and responsive to the indication of degradation of the oxygen sensor, adjusting a second diagnostic threshold for a catalyst monitor. A sixth example of the method optionally includes one or more of the first through fifth examples, and further includes wherein indicating degradation of the oxygen sensor includes indicating slow sensor response. A seventh example of the method optionally includes one or more of the first through sixth examples, and further includes initiating the catalyst monitor responsive to corresponding monitor entry conditions being met; indicating degradation of the catalyst responsive to a measured output of the oxygen sensor exceeding the second diagnostic threshold; and responsive to the indication of degradation of the catalyst, reducing a peak-to-peak air-fuel ratio during an air-fuel ratio oscillation. An eighth example of the method optionally includes one or more of the first through seventh examples, and further includes wherein indicating degradation of the catalyst includes indicating catalyst aging.

In another example, a method for an engine includes: indicating an air leak in an exhaust passage based on a measured pressure at a particulate filter coupled downstream of an exhaust catalyst; adjusting a threshold for an oxygen sensor monitor responsive to the indication of the air leak, the oxygen sensor coupled downstream of the catalyst; and indicating degraded sensor response based on oxygen sensor output during an air-fuel ratio oscillation relative to the threshold. In a first example of the method, the method further includes wherein the threshold is a first threshold and the air-fuel ratio oscillation is a first air-fuel ratio oscillation, the method further comprising: adjusting a second threshold for a catalyst monitor responsive to the indication of degraded sensor response; and indicating catalyst aging based on oxygen sensor output during a second air-fuel ratio oscillation relative to the second threshold. A second example of the method optionally includes the first example and further includes indicating a state of the filter based on the measured pressure; and limiting an engine load based on the indicating. A third example of the method optionally includes one or more of the first and second examples, and further includes wherein the indicating includes: indicating the air leak in the exhaust passage responsive to the measured pressure being higher than a first threshold pressure; and indicating a degraded state of the filter responsive to the measured pressure being higher than a second threshold pressure, higher than the first threshold pressure, the first threshold pressure calibrated as a function of filter soot load and engine speed. A fourth example of the method optionally includes one or more of the first through third examples, and further includes wherein the adjusting includes: increasing the first threshold responsive to the indication of the air leak; and increasing the second threshold responsive to the indication of degraded sensor response. A fifth example of the method optionally includes one or more of the first through fourth examples, and further includes, wherein the measured pressure includes one of a filter inlet pressure and a differential pressure across the filter.

A system for a hybrid vehicle includes an engine system including: an engine; an exhaust passage including an exhaust catalyst; an upstream oxygen sensor coupled upstream of the exhaust catalyst; a downstream oxygen sensor coupled downstream of the exhaust catalyst; a particulate filter coupled downstream of the second oxygen sensor; a pressure sensor coupled to the particulate filter; and a controller with computer readable instructions stored on non-transitory memory for: responsive to entry conditions for a first monitor of the downstream oxygen sensor being met, comparing an output of the pressure sensor to a threshold pressure; and raising a threshold of the first monitor responsive to the output of the pressure sensor being higher than the threshold pressure; executing the first monitor; and indicating degradation of the downstream oxygen sensor responsive to an output of the downstream oxygen sensor exceeding the raised threshold following the executing of the first monitor. In a first example of the system, the system further includes where the controller includes further instructions for: responsive to entry conditions for a second monitor of the catalyst being met, raising a threshold of the first monitor responsive to the indication of degradation of the downstream oxygen sensor; executing the second monitor; and indicating degradation of the catalyst responsive to the output of the downstream oxygen sensor exceeding the raised threshold following the executing of the second monitor. A second example of the system optionally includes the first example and further includes wherein the pressure sensor is one of an absolute pressure sensor coupled to an inlet of the filter, and a differential pressure sensor coupled to each of the inlet and an outlet of the filter. A third example of the system optionally includes one or more of the first and second examples, and further includes wherein executing each of the first monitor and the second monitor includes oscillating an air-fuel ratio between a richer than stoichiometric air-fuel ratio and a leaner than stoichiometric air-fuel ratio (inventors: please confirm), and wherein the controller includes further instructions for: responsive to the indication of degradation of the catalyst, reducing an amplitude of the air-fuel ratio oscillation. A fourth example of the system optionally includes one or more of the first through third examples, and further includes wherein the threshold pressure is a first pressure, and wherein the controller includes further instructions for: comparing the output of the pressure sensor to a second threshold pressure, higher than the first threshold pressure; indicating degradation of the filter responsive to the output of the pressure sensor exceeding the second threshold pressure; and responsive to the indicating, limiting an engine load until an operator input indicating replacement of the filter is received.

In another representation, a method for an engine includes: detecting each of an air leak in an exhaust passage, upstream of an exhaust oxygen sensor, and a state of an exhaust particulate filter based on an output of a pressure sensor coupled to the particulate filter, the oxygen sensor coupled downstream of an exhaust catalyst, the particulate filter coupled downstream of the oxygen sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing may be modified to achieve the features and advantages of the example embodiments described herein, and the depicted processing order is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting a diagnostic threshold of an oxygen sensor coupled downstream of an exhaust catalyst responsive to a measured pressure at a particulate filter coupled downstream of the oxygen sensor; and responsive to an indication of degradation of the catalyst, which is responsive to a measured output of the oxygen sensor, reducing a peak-to-peak air-fuel ratio during an air-fuel ratio oscillation.

2. The method of claim 1, wherein the measured pressure at the particulate filter includes one of a measured inlet pressure of the particulate filter and a differential pressure across the particulate filter.

3. The method of claim 1, wherein the adjusting responsive to the measured pressure includes adjusting responsive to the measured pressure exceeding a first threshold, the first threshold calibrated based on a soot load at the particulate filter, the method further comprising, responsive to the measured pressure exceeding a second threshold, higher than the first threshold, indicating particulate filter degradation.

4. The method of claim 3, wherein the adjusting includes increasing the diagnostic threshold responsive to the measured pressure exceeding the first threshold, the diagnostic threshold increased further as a difference between the measured pressure and the first threshold increases.

5. The method of claim 3, further comprising indicating an exhaust air leak responsive to the measured pressure exceeding the first threshold.

6. The method of claim 1, wherein the diagnostic threshold is a first diagnostic threshold for an oxygen sensor monitor routine, the method further comprising:
  initiating the oxygen sensor monitor routine responsive to corresponding monitor entry conditions being met;
  indicating degradation of the oxygen sensor responsive to a measured output of the oxygen sensor exceeding the first diagnostic threshold; and
  responsive to the indication of degradation of the oxygen sensor, adjusting a second diagnostic threshold for a catalyst monitor routine.

7. The method of claim 6, wherein indicating degradation of the oxygen sensor includes indicating slow sensor response.

8. The method of claim 6, further comprising:
  initiating the catalyst monitor routine responsive to corresponding monitor entry conditions being met.

9. The method of claim 8, wherein indicating degradation of the catalyst includes indicating catalyst aging.

10. A method, comprising:
  oscillating an air-fuel ratio of an engine;
  indicating an air leak in an exhaust passage of the engine based on a measured pressure at a particulate filter coupled downstream of an exhaust catalyst;
  adjusting a threshold for a monitor routine of an oxygen sensor responsive to the indication of the air leak, the oxygen sensor coupled downstream of the catalyst; and
  indicating a degraded sensor response based on oxygen sensor output during the air-fuel ratio oscillation relative to the threshold.

11. The method of claim 10, wherein the measured pressure includes one of a particulate filter inlet pressure and a differential pressure across the particulate filter.

12. The method of claim 10, wherein the threshold is a first threshold and the air-fuel ratio oscillation is a first air-fuel ratio oscillation, the method further comprising:
  adjusting a second threshold for a catalyst monitor routine responsive to the indication of degraded sensor response; and
  indicating catalyst aging based on oxygen sensor output during a second air-fuel ratio oscillation relative to the second threshold.

13. The method of claim 12, wherein the adjusting includes:
  increasing the first threshold responsive to the indication of the air leak; and
  increasing the second threshold responsive to the indication of degraded sensor response.

14. The method of claim 12, further comprising:
  indicating a state of the particulate filter based on the measured pressure; and
  limiting an engine load based on the indicating.

15. The method of claim 14, wherein the indicating includes:
  indicating the air leak in the exhaust passage responsive to the measured pressure being higher than a first threshold pressure; and
  indicating a degraded state of the particulate filter responsive to the measured pressure being higher than a second threshold pressure, higher than the first threshold pressure, the first threshold pressure calibrated as a function of filter soot load and engine speed.

16. An engine system, comprising:
  an engine;
  an exhaust passage including an exhaust catalyst;
  an upstream oxygen sensor coupled upstream of the exhaust catalyst;
  a downstream oxygen sensor coupled downstream of the exhaust catalyst;
  a particulate filter coupled downstream of the downstream oxygen sensor;
  a pressure sensor coupled to the particulate filter; and
  a controller with computer readable instructions stored on non-transitory memory for:
    responsive to entry conditions for a first monitor routine of the downstream oxygen sensor being met,
    comparing an output of the pressure sensor to a threshold pressure; and
    raising a threshold of the first monitor routine responsive to the output of the pressure sensor being higher than the threshold pressure;
    executing the first monitor routine; and
    indicating degradation of the downstream oxygen sensor responsive to an output of the downstream oxygen sensor exceeding the raised threshold following the executing of the first monitor routine.

17. The system of claim 16, wherein the pressure sensor is one of an absolute pressure sensor coupled to an inlet of the particulate filter, and a differential pressure sensor coupled to each of the inlet and an outlet of the particulate filter.

18. The system of claim 16, wherein the threshold pressure is a first threshold pressure, and wherein the controller includes further instructions for:
  comparing the output of the pressure sensor to a second threshold pressure, higher than the first threshold pressure;
  indicating degradation of the particulate filter responsive to the output of the pressure sensor exceeding the second threshold pressure; and
  responsive to the indicating, limiting an engine load until an operator input indicating replacement of the particulate filter is received.

19. The system of claim 16, where the controller includes further instructions for:
  responsive to entry conditions for a second monitor routine of the catalyst being met, raising a threshold of the first monitor routine responsive to the indication of degradation of the downstream oxygen sensor;

executing the second monitor routine; and indicating degradation of the catalyst responsive to the output of the downstream oxygen sensor exceeding the raised threshold following the executing of the second monitor routine.

20. The system of claim 19, wherein executing each of the first monitor routine and the second monitor routine includes oscillating an air-fuel ratio between a richer than stoichiometric air-fuel ratio and a leaner than stoichiometric air-fuel ratio, and wherein the controller includes further instructions for:

responsive to the indication of degradation of the catalyst, reducing an amplitude of the air-fuel ratio oscillation.

* * * * *